(12) United States Patent
Rached et al.

(10) Patent No.: US 12,422,176 B2
(45) Date of Patent: Sep. 23, 2025

(54) METHOD OF FORMING REFRIGERANT SYSTEMS

(71) Applicant: HONEYWELL INTERNATIONAL INC., Charlotte, NC (US)

(72) Inventors: Wissam Rached, Charlotte, NC (US); Pawel Wisnik, Charlotte, NC (US); Kaimi Gao, Charlotte, NC (US); Nilesh Purohit, Charlotte, NC (US); Ankit Sethi, Charlotte, NC (US); Jean De Bernardi, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 260 days.

(21) Appl. No.: 18/222,781

(22) Filed: Jul. 17, 2023

(65) Prior Publication Data

US 2024/0027114 A1    Jan. 25, 2024

Related U.S. Application Data

(60) Provisional application No. 63/390,189, filed on Jul. 18, 2022.

(51) Int. Cl.
*F25B 45/00*    (2006.01)
*C09K 5/04*    (2006.01)

(52) U.S. Cl.
CPC ............. *F25B 45/00* (2013.01); *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
CPC .. F25B 45/00; F25B 5/02; F25B 40/02; F25B 2400/075; C09K 5/045; C09K 2205/122; C09K 2205/126; C09K 2205/22; C09K 2205/40

See application file for complete search history.

(56) References Cited

FOREIGN PATENT DOCUMENTS

CN    111373214 A  *  7/2020  ............. C09K 5/042

* cited by examiner

*Primary Examiner* — Kun Kai Ma
(74) *Attorney, Agent, or Firm* — FisherBroyles, LLP; Joseph F. Posillico

(57) ABSTRACT

Methods for improving a refrigeration systems comprising modifying the system and replacing existing refrigerant with a replacement refrigerant comprising: (1) at least about 50% by weight of R1234ze(E); (2) greater than 0% to about 11% of HFC-134a, HFC-134, HFC-227ea, HFC-125, and combinations of two or more of these; and (3) from about 4% to about 20% by weight of HFO-1336mzz(E), HFO-1224yd (Z), and combinations of these, wherein said second refrigerant: (i) has an Occupational Exposure Limit (OEL) greater than 400; (ii) is classified as class A1 by ASHRAE Standard 34; and (iii) has a GWP of about 150 or less.

20 Claims, 2 Drawing Sheets

METHOD OF FORMING REFRIGERANT SYSTEMS

CROSS REFERENCE TO RELATED APPLICATIONS

This invention relates to and claims the priority benefit of provisional application 63/390,189, filed Jul. 18, 2023, which is incorporated herein by reference in its entirety.

FIELD OF THE INVENTION

This invention relates to improving heat transfer systems that use high global warming refrigerants, such as R404A, R448, R449, R407 and others. The present invention further extends to heat transfer systems obtainable by these methods and to heat transfer methods using such improved heat transfer systems.

BACKGROUND

Mechanical refrigeration systems, and related heat transfer devices, such as heat pumps and air conditioners, using refrigerant liquids are well known in the art for industrial, commercial and domestic uses. Chlorofluorocarbons (CFCs) were developed in the 1930s as refrigerants for such systems. However, since the 1980s the effect of CFCs on the stratospheric ozone layer has become the focus of much attention. In 1987, a number of governments signed the Montreal Protocol to protect the global environment, setting forth a timetable for phasing out the CFC products. CFCs were replaced with more environmentally acceptable materials that contain hydrogen, namely the hydrochlorofluorocarbons (HCFCs). One of the most commonly used hydrochlorofluorocarbon refrigerants was chlorodifluoromethane (HCFC-22). However, subsequent amendments to the Montreal protocol accelerated the phase out of the CFCs and also scheduled the phase-out of HCFCs, including HCFC-22.

Creating new refrigerants meeting environmental demands whilst having the necessary mosaic of advantageous performance properties has represented a huge and complex challenge to industry. Improving one performance property often worsens performance in another category, exacerbated by individual commercial applications often placing their own specific demands on the refrigerant.

For example, heat transfer fluids such as R22, R404A, R407A, R448A, R449A etc. have been used in large distributed direct expansion refrigeration systems for commercial use, such as supermarkets, for low or medium temperature applications. However, these refrigerants have unacceptably high Global Warming Potentials (GWPs) according to IPCC AR5: R404A (GWP=3940), R22 (GWP=1760), R407F (GWP=1674), R448A (GWP=1273), R449A (GWP=1283). Since it is likely that the fittings, hoses and/or pieces of equipment in such systems will eventually leak, such environmentally damaging refrigerants will likely escape to the atmosphere. Moreover, since long conduit runs involve more pipefitting joints, valves and the like that may potentially leak, when a leak does occur, the longer the conduit run, the larger the quantity of high GWP refrigerant will be lost to the atmosphere.

Efforts to address the problem of the environmental deficiencies of such distributed refrigeration systems present a substantial engineering challenge, in part because of the large cost that would be associated with a wholesale replacement of such costly and large systems. Moreover, conventional roof-mounted or machine room condenser/compressor systems provide high levels of efficiency and capacity, and any effort to modify these systems to be more environmentally attractive should desirably maintain this efficiency and capacity.

Efforts to address the problem of the environmental deficiencies of such distributed refrigeration systems present a substantial engineering challenge, in part because of the large cost that would be associated with a wholesale replacement of such costly and large systems. Moreover, conventional roof-mounted or machine room condenser/compressor systems provide high levels of efficiency and capacity, and any effort to modify these systems to be more environmentally attractive should desirably maintain this efficiency and capacity.

Several thermodynamic and fluid flow challenges arise in connection with efforts to convert a conventional distributed refrigeration system to be more environmentally friendly while maintaining efficiency and capacity. For example, applicants have come to appreciate that it is very difficult, if not impossible, to identify an environmentally friendly refrigerant (e.g., GWP of about 150 or less (as measured by AR5)) that can be simply used in an existing distributed refrigeration system in place of the existing high GWP refrigerant. Previously disclosed replacements for R-22 have been studied and shown to result in a cooling capacity decrease and a power requirement increase, thus resulting in an overall significant reduction in performance. (See WO2020/223196A1). This demonstrates the difficulty of developing a viable solution for this problem.

In addition, it is generally considered either important or essential in many applications, including particularly in many distributed refrigeration systems, to use compositions which are non-flammable. As used herein, the term "non-flammable" refers to compounds or compositions which are determined to be non-flammable as determined in accordance ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference. Unfortunately, many HFCs which might otherwise be desirable as retrofits for existing distributed refrigeration systems are not non-flammable as that term is used herein. For example, the fluoroalkane difluoroethane (HFC-152a) and the fluoroalkene 1,1,1-trifluorpropene (HFO-1243zf) are each flammable and therefore not viable for use in many applications.

Regarding efficiency in use, it is important to note that a loss in refrigerant thermodynamic performance or energy efficiency may have secondary environmental impacts through increased fossil fuel usage arising from an increased demand for electrical energy.

The present application describes inventions that meet these and other needs. The present application describes methods of improving heat transfer systems, notably distributed systems, that enable the skilled person to replace a refrigerant with a lower GWP refrigerant, whilst maintaining acceptable thermodynamic performance (notably operating capacity) and with only small changes to system infrastructure. Minimizing the changes of system infrastructure is particularly attractive because it minimizes the amount of equipment downtime and financial capital cost expenditure associated with the method.

SUMMARY

Applicants have found that the above-noted needs, and other needs, can be satisfied by methods for improving a heat transfer system, wherein said heat transfer system comprises:
  (i) an existing refrigerant having a GWP of greater than 150; and
  (ii) an existing refrigeration circuit comprising, in order of refrigerant flow, at least one evaporator located in or near a refrigerated space containing products accessible to consumers, at least one compressor, and at least one condenser, and at least one expansion device;
wherein said method comprises:
  (a) installing a subcooling refrigeration circuit comprising a subcooling refrigerant and, in order of refrigerant flow, a compressor, a heat exchanger for expelling heat from the subcooling refrigeration circuit, an expansion device, and a subcooling heat exchanger, wherein:
    a. said subcooling heat exchanger thermally connects said subcooling refrigeration circuit and said existing refrigeration circuit between said at least one condenser and said at least one expansion device (e.g. expansion valve) of the existing refrigerant circuit; and
    b. said subcooling heat exchanger is configured to transfer heat from the existing refrigerant circuit to the subcooling circuit; and
  (b) replacing said existing refrigerant with a replacement refrigerant comprising: (1) at least about 50% by weight of R1234ze(E); (2) greater than 0% to about 11% of HFC-134a, HFC-134, HFC-227ea, HFC-125, and combinations of two or more of these; and (3) from about 4% to about 20% by weight of HFO-1336mzz(E), HFO-1224yd(Z), and combinations of these, wherein said replacement refrigerant: (i) has an Occupational Exposure Limit (OEL) greater than 400; (ii) is classified as class A1 by ASHRAE Standard 34; and (iii) has a GWP of about 150 or less.

As will be appreciated by the skilled person, the method of improving the heat transfer system requires minimal changes to the existing equipment. The majority of lines/conduits/pipes do not need to be changed in order to implement the present methods and in most cases will simply remain in place, as will the evaporator, condenser, compressor and so on. Instead, the existing circuit is modified by installing a subcooling heat exchanger that enables the subcooling refrigeration circuit to further cool the replacement refrigerant en route to the expansion device(s)/valve(s) and evaporator(s). This change dramatically increases the capacity of the system, which enables a low GWP refrigerant to be used whilst maintaining attractive thermodynamic performance. The nature of the subcooling refrigerant is not particularly limited, which provides the skilled person with the further advantage of being able to flexibly choose a subcooling refrigerant to meet the specific desires of their system.

The present invention also includes heat transfer systems that can be obtained by the method described above and herein. The invention includes heat transfer systems that comprise:
  (a) a first (core) refrigeration circuit comprising:
    a. in refrigerant flow order a condenser, an optional receiver, a subcooling heat exchanger, at least one expansion device (e.g. expansion valve), at least one evaporator located in or near a refrigerated space containing products accessible to consumers, and at least one compressor; and
    b. a core refrigerant within the first (core) refrigeration circuit, wherein the wherein the core refrigerant comprises: (1) at least about 50% by weight of R1234ze(E); (2) greater than 0% to about 11% of HFC-134a, HFC-134, HFC-227ea, HFC-125, and combinations of two or more of these; and (3) from about 4% to about 20% by weight of HFO-1336mzz(E), HFO-1224yd(Z), and combinations of these, wherein said core refrigerant: (i) has an Occupational Exposure Limit (OEL) greater than 400; (ii) is classified as class A1 by ASHRAE Standard 34; and (iii) has a GWP of about 150 or less; and
  (b) a sub-cooling refrigeration circuit comprising:
    a. in refrigerant flow order a compressor, a heat exchanger for expelling heat from the sub-cooling refrigeration circuit, an expansion device (e.g. expansion valve) and the subcooling heat exchanger of the first refrigeration circuit; wherein the subcooling heat exchanger is configured to transfer heat to the subcooling refrigeration circuit from between said at least one condenser and said at least one expansion device (e.g. expansion valve) of the first (core) refrigerant circuit; and
    b. a subcooling refrigerant within the subcooling refrigeration circuit.

It will be apparent to the skilled person that heat transfer systems can be obtained by the methods of improving heat transfer systems as described above and hereinafter. Accordingly, the first/core refrigeration circuit of the heat transfer system corresponds to the existing refrigeration circuit of the methods for improving a heat transfer system. Every disclosure relating to the existing refrigeration circuit in this patent application can therefore be unambiguously applied to the first/core refrigeration circuit of the refrigeration system described above and elsewhere in this patent application, both individually and collectively.

The present invention also extends to heat transfer methods using heat transfer systems as described above and hereinafter. The heat transfer methods are especially useful when seeking to provide refrigeration, as will be described in more detail below.

DETAILED DESCRIPTION

Definitions

Figure 1:
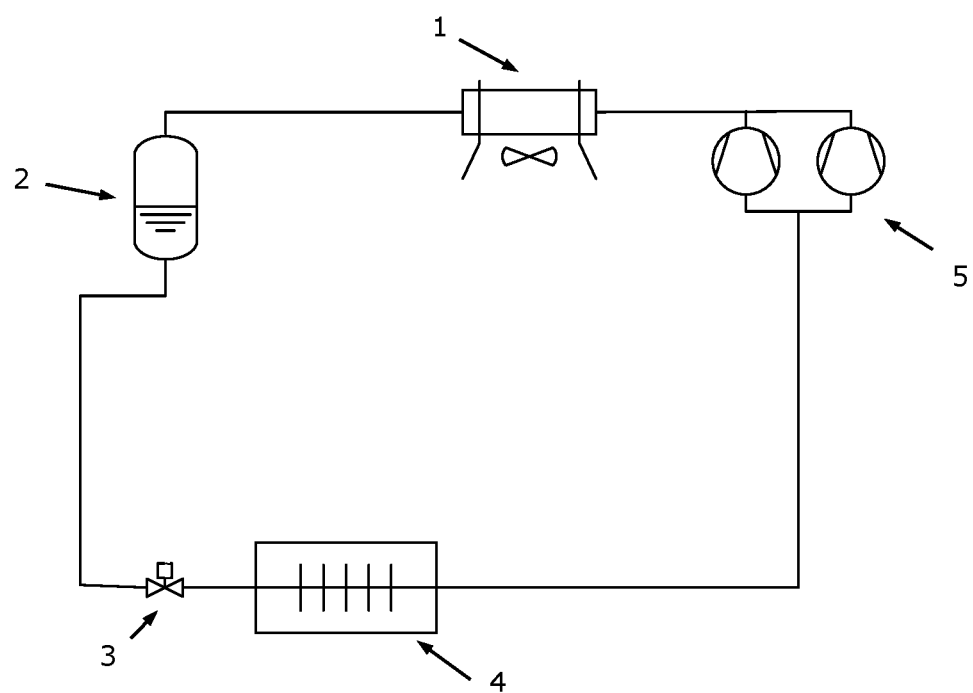
FIG. 1 is a semi-schematic representation of a prior art system.

For the purposes of this invention, the term "about" in relation to the amounts expressed in weight percent for amounts greater than 2% means that the amount of the component can vary by an amount of +/−2% by weight.

For the purposes of this invention, the term "about" in relation to temperatures in degrees centigrade (° C.) means that the stated temperature can vary by an amount of +/−5° C.

For the purposes of this invention, the term "about" in relation to percentage of power usage means that the stated percentage can vary by an amount of up to 1%.

For the purposes of this invention, the term "substantial portion" in relation to removal of an existing refrigerant from a heat transfer system means removing at least about 50% of the existing refrigerant contained in the system.

The term "capacity" is the amount of cooling provided, in BTUs/hr. or kW, by the refrigerant in the refrigeration system. This is experimentally determined by multiplying the change in enthalpy in BTU/lb., or kJ/kg, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety).

The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The term "centralized refrigeration system" as used herein means a refrigeration system that includes one or more centrally located compressors or rack of compressors and one or more centrally located condensers, and a plurality of evaporators located remotely from said centralized compressor or rack of compressors and which receive liquid refrigerant from said centrally located condenser(s).

In contrast to a centralized system, the term "distributed refrigeration system" means a system that comprises several compressors or compressor racks distributed next to, or in close proximity to, the location requiring refrigeration (e.g. display cases).

"Direct Expansion" as used herein means heat transfer systems which utilize evaporators in which the liquid refrigerant enters the evaporator and flows through coils (preferably tubular coils) and vaporizes as heat is absorbed from air circulating in the display case, and which uses a thermostatic expansion valve at the inlet of the evaporator and which is controlled to feed enough refrigerant to result in substantially all of the refrigerant being evaporated at the evaporator outlet and to optionally have a predetermined amount of super heat at the exit.

The phrase "Global Warming Potential" (hereinafter "GWP") was developed to allow comparisons of the global warming impact of different gases, and as used herein refers to GWP as determine by AR5 as describe above. Specifically, it is a measure of how much energy the emission of one ton of a gas will absorb over a given period of time, relative to the emission of one ton of carbon dioxide. The larger the GWP, the more that a given gas warms the Earth compared to CO2 over that time period. The time period usually used for GWP is 100 years. GWP provides a common measure, which allows analysts to add up emission estimates of different gases. See http://www.protocolode-montreal.org.br/site/images/publicacoes/setor_manufatu-ra_equipa mentos_refrigeracao_arcondicionado/Como_cal-cular_el_Potencial_de_Calentamiento_Atmos ferico_en_las_mezclas_de_refrigerantes.pdf The term "Occupational Exposure Limit (OEL)" is determined in accordance with ASHRAE Standard 34-2016 Designation and Safety Classification of Refrigerants.

The phrase "acceptable toxicity" as used herein means the composition is classified as class "A" by ASHRAE Standard 34-2016 Designation and Safety Classification of Refrigerants and described in Appendix B1 to ASHRAE Standard 34-2016 (as each standard exists as of the filing date of this application). A substance which is non-flammable and low toxicity would be classified as "A1" by ASHRAE Standard 34-2016 Designation and Safety Classification of Refrigerants and described in Appendix B1 to ASHRAE Standard 34-2016 (as each standard exists as of the filing date of this application).

The term "mass flow rate" is the mass of refrigerant passing through a conduit per unit of time.

As used herein, the term "replacement" means the use of a composition of the present invention in a heat transfer system that had been designed for use with or is suitable for use with another refrigerant. By way of example, when a refrigerant or heat transfer composition of the present invention is used in a heat transfer system that was designed for use with R-410A, then the refrigerant or heat transfer composition of the present invention is a replacement for R-410A in said system. It will thus be understood that the term "replacement" includes the use of the refrigerants and heat transfer compositions of the present invention in both new and existing systems that had been designed for use with, are commonly used with, or are suitable for use with R-410A.

The term "glide" applies to zeotropic refrigerant mixtures that have varying temperatures during phase change processes in the evaporator or condenser at constant pressure and are quantified herein as the difference between the saturated vapor temperature and the saturated liquid temperature at pressure of 100 kPa.

The term "low temperature refrigeration system" refers to heat transfer systems which operate with a condensing temperature of from about 40° C. to about 70° C. and evaporating temperature of from about −45° C. up to and including −12° C.

The term "medium temperature refrigeration system" refers to heat transfer systems which operate with a condensing temperature of from about 40° C. to about 70° C. and evaporating temperature of from −12° C. to about 0° C.

The term "supermarket refrigeration" as used herein refers to commercial refrigeration systems that are used to maintain chilled or frozen food in both product display cases and storage refrigerators.

The term "subcooling" as used herein refers to cooling the replacement (or core) refrigerant to a temperature substantially below the temperature at the outlet of the condenser. In reference to FIGS. 3 and 4, subcooling means the difference between the condensing temperature and the liquid temperature at the expansion device/vale inlet.

The term "normal boiling point" refers to the boiling point of a single component measured at 1 atmosphere of pressure and refers to the initial boiling point of a blend of components at 1 atmosphere.

The term "R22" means chlorodifluoromethane.

The terms "HFC32" and "R32" as used herein each mean difluoromethane.

The terms "HFC-125" and "R125" mean pentafluoroethane.

The terms "HFC-134a" and "R134a" means 1,1,1,2-tetrafluoroethane.

The terms "HFC-134" and "R134" means 1,1,2,2-tetrafluoroethane.

The term "R143a" means 1,1,1-trifluoroethane.

The term R290 means propane.

The term "R404A" means a combination of about 44% by weight of R-125, about 52% by weight of R143a and about 4% by weight of R-134a.

The term "R407A" means a combination of about 20% by weight of R-32, about 40% by weight of R125, and about 40% by weight of R-134a.

The term "R407B" means a combination of about 10% by weight of R-32, about 70% by weight of R125, and about 20% by weight of R-134a.

The term "R407C" means a combination of about 23% by weight of R-32, about 25% by weight of R125, and about 52% by weight of R-134a.

The term "R407D" means a combination of about 15% by weight of R-32, about 15% by weight of R125, and about 70% by weight of R-134a.

The term "R407F" means a combination of about 40% by weight of R-32, about 30% by weight of R125, and about 30% by weight of R-134a.

The term "R407" means any of R407A, R407B, R407C, R407D and R407F.

The term "R448A" means a combination of about 26% by weight of R-32, about 26% by weight of R125, and about 21% by weight of R-134a.

The term "R448A" means a combination of about 26% by weight of R-32, about 26% by weight of R125, and about 21% by weight of R-134a.

The term "R448" means a refrigerant designated as R448 with any letter designation, including R448A.

The term "R449A" means a combination of about 24.3% by weight of R-32, about 24.7% by weight of R125, and about 25.7% by weight of R-134a.

The term "R449" means a refrigerant designated as R449 with any letter designation, including R449A.

The term "R454B" means a combination of about 68.9% by weight of R-32 and about 31.1% by weight of R1234yf.

The term "R454" means a refrigerant designated as R454 with any letter designation, including R454B.

The term "R513A" means a combination of about 44% by weight of R-134a and about 56% by weight of R1234yf.

The term "R449" means a refrigerant designated as R449 with any letter designation, including R449A.

The terms "HFO1234yf" and "R1234yf" as used herein each mean 2,3,3,3-tetrafluoropropene.

The terms "HFO1234ze(E)," R1234ze(E) and "1234ze (E)" as used herein each mean trans-1,3,3,3-tetrafluoropropene. Unless otherwise stated, "HFO1234ze," R1234ze and "1234ze" mean trans-1,3,3,3-tetrafluoropropene.

Reference herein to a group of defined items includes all such defined items, including all such items with suffix designations.

Systems and Methods

The present invention incorporates methods of improving an existing heat transfer system.

Figure 2:
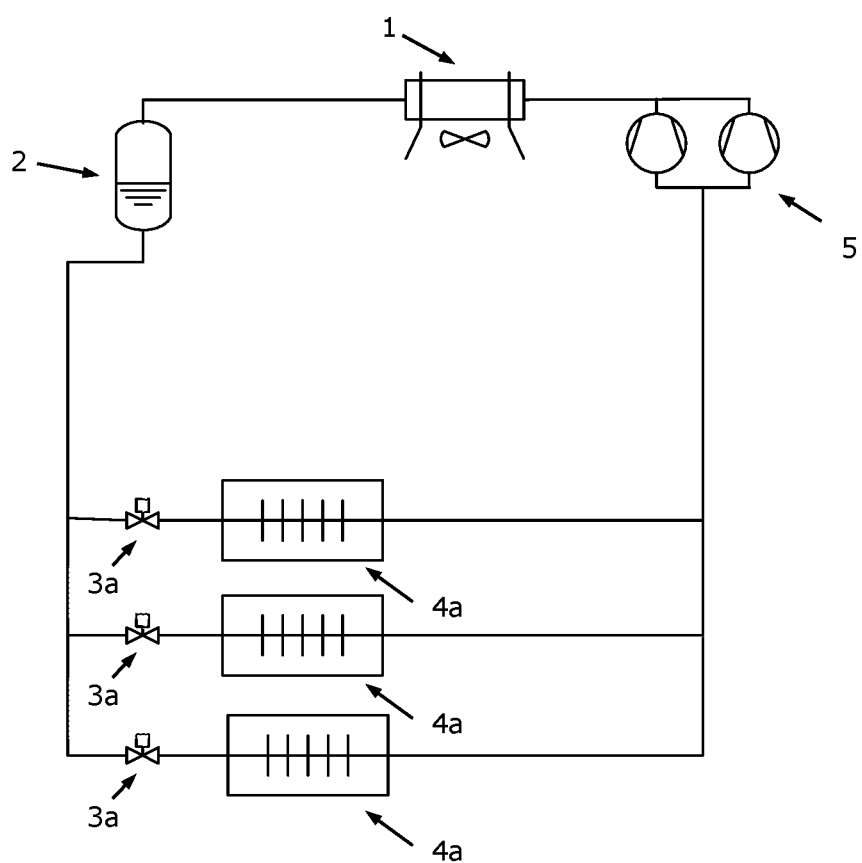
FIG. 2 is a semi-representation of a prior art distributed system.

Prior to improvement, the existing heat transfer system comprises:

(i) an existing refrigerant having a GWP of greater than 150 (e.g. greater than 500, or greater than 1200);

(ii) an existing refrigeration circuit comprising, in order of flow, at least one evaporator located in or near a refrigerated space containing products accessible to consumers, at least one compressor (or a rack of compressors), at least one condenser, and at least one expansion device (e.g. at least one expansion valve);

The existing heat transfer system can be further understood by reference to FIGS. 1 and 2, which are representative examples of existing distributed refrigeration systems of the type to be improved according to the present invention. As the skilled person will be aware, these types of systems operate by circulating a refrigerant around a vapor-compression refrigeration circuit. At least one evaporator (4, 4*a*) is located in or near a refrigerated space, such as a space containing consumable products accessible to consumers. The evaporator serves to transfer heat from the refrigerated space to the refrigerant, which generally changes from a liquid/vapor to a vapor as a result. The vapor passes to at least one compressor or compressor rack (5), which compresses the refrigerant to a higher temperature. The compressed refrigerant vapor passes to the condenser (1), in which heat is released from the refrigerant during its conversion to a liquid. A receiver (3) is optionally located downstream of the condenser to provide a reservoir of liquid refrigerant to feed the expansion device 3. Before returning to the at least one evaporator (4, 4*a*), the refrigerant rapidly evaporates as it passes through at least one expansion device (3, 3*a*) (e.g. at least one expansion valve) to produce the cooled liquid-vapor desired for accepting heat in the at last one evaporator. When multiple evaporators and expansion devices or valves (3*a*) are present, each evaporator/expansion valve pair can service different refrigeration cabinets in a distributed system, e.g. a commercial shop such as a food shop (e.g. a supermarket), optionally operating at different temperatures.

The at least one evaporator (4, 4*a*) are preferably configured to operate at as a medium temperature evaporator(s). Optionally the evaporator is configured to operate at a temperature of from −12° C. to 0° C.

Although shown schematically in FIGS. 1 and 2, in practice each of these piping networks generally represents an extensive and long series of conduits for transporting the liquid refrigerant from the accumulator receiver (3), which is often placed, along with the compressor or compressor rack (5) and the condenser (1), at a location that is remote from the display cases. Thus, the piping network is often large, covering the distance from, for example, the roof or machine room of a supermarket to spreading over the supermarket floor in order to reach the multitude of display cases located there.

It will also be appreciated by those skilled in the art that while the compressor(s) or compressor rack in FIGS. 1 and 2 is depicted as having two compressors, in practice the compressor/compressor rack can comprise from one compressor up to about 5 compressors, depending on individual applications. The existing refrigerant systems that are provided according to the present invention can represent a compressor work capacity of from about 3 kW to about 500 kW. With respect to the type of compressor, it is contemplated that all types of compressors can be present in such systems, but in many of such systems the compressors which are used are selected from screw compressors, scroll compressors, reciprocating compressors, centrifugal compressors, dual screw compressors and combinations of these.

The existing refrigerant within the existing refrigeration circuit generally has a GWP of greater than 150, greater than 500 or greater than 1200 (determined according to AR5). Preferred existing refrigerants include R404A, R407 (including each of R407A, R407B, R407C, R407D), R448 (all letter designations), R449 (all letter designations), R454, R513, R22 and 134a, more preferably R404A, R407A, R407B, R407C, R407D, R448 (all letter designations) and R449 (all letter designations), most preferably R404A.

The present invention involves improving systems such as the type disclosed in FIG. 1 and FIG. 2 to improve the environmental friendliness of the system while at least achieving acceptable performance of the overall system, and preferably improving overall heat transfer performance, and without deteriorating the safety aspects of the system in terms of toxicity and flammability of refrigerants that are exposed to areas open to the public.

The improvement method generally involves two main steps: inserting a subcooling refrigeration circuit connected via a subcooling heating exchanger; and replacing the existing refrigerant with a replacement refrigerant (e.g. by removing substantially all of the existing refrigerant before adding the replacement refrigerant to the system). The skilled person will appreciate that these steps can be performed in any order subject to the practical limitations of the system they are improving. For example, if it is practical to isolate the existing refrigerant away from the areas of the existing system that will be mechanically altered or replaced, then it is possible to replace the existing refrigerant after installing the subcooling refrigeration circuit without risking a leak of the existing refrigerant. If it is not practical to isolate the existing refrigerant in this way, as is generally the case, then it is more practical to remove the existing refrigerant, install the subcooling refrigeration circuit and subcooling heat exchanger, and then add the replacement refrigerant to the system. Doing so reduces the risk of leaking the existing refrigerant. The method steps are discussed below in an order that is consistent with the sequence of steps shown in claim 1, but the skilled person will appreciate that the present invention is not limited to this order of events.

The subcooling heat exchanger is installed in the fluid connection between the condenser and the at least one expansion device (e.g. at least one expansion valve) of the existing refrigeration circuit. If a receiver (2) is present, then the subcooling heat exchanger is generally installed in the fluid connection between the receiver and the at least one expansion device. This task generally involves removing some of all of this fluid connection by replacing the piping entirely or by removing a section of this pipe.

The nature of the subcooling heat exchanger (6) is not particularly limited and it is within the abilities of the skilled person to choose an appropriate design for their system. However, the heat exchanger is configured to thermally couple the existing circuit and the subcooling circuit being installed by enabling heat transfer from the existing heat transfer circuit to the subcooling refrigeration circuit. In this way, the subcooling circuit facilitates additional cooling of the refrigerant in the existing refrigeration circuit before it reaches the expansion devices or valves (3, 3a).

Figure 3:
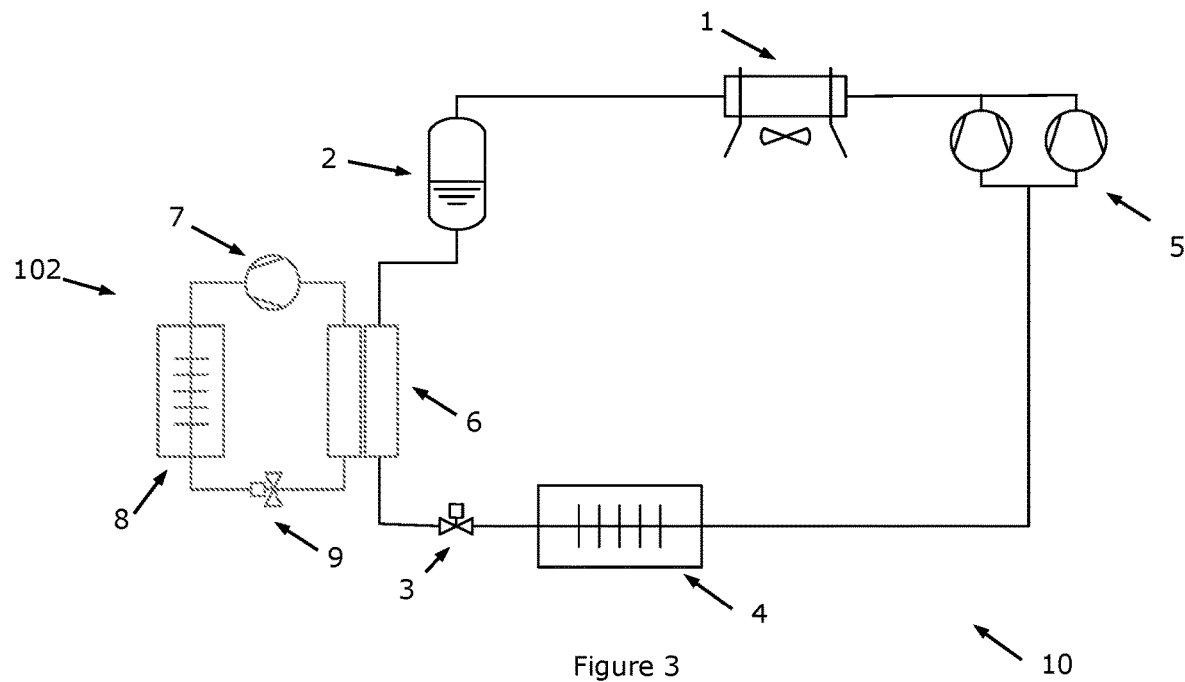
FIG. 3 is a semi-schematic representation of a system according to the present invention.
Figure 4:
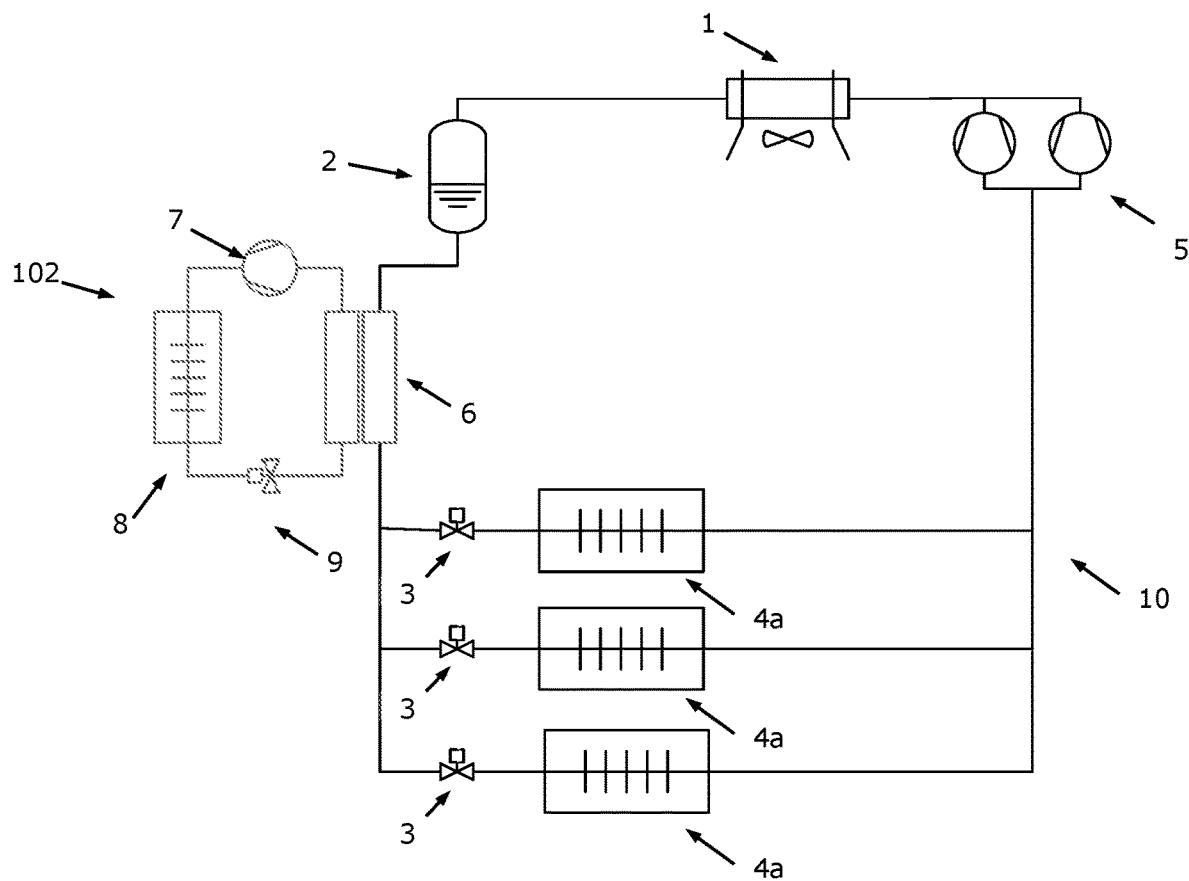
FIG. 4 is a semi-schematic representation of a distributed system according to the present invention.

As explained above, the subcooling heat exchanger forms a key part of the subcooling refrigeration circuit. This circuit can take the form illustrated in FIGS. 3 and 4, for example, which depict heat transfer systems that result from applying the method of claim 1 to the heat transfer systems of FIGS. 1 and 2. In FIGS. 3 and 4, the remains of the existing refrigeration circuit (101) is shown to be thermally coupled with the subcooling refrigeration circuit (102) via the subcooling heat exchanger (6). The subcooling heat exchanger is configured to cool refrigerant passing from condenser (1) to expansion devices/valves (3, 3a) and downstream of the optional receiver (2). As shown, the subcooling circuit further comprises a compressor (7), a heat exchanger (8) for expelling heat from the subcooling refrigerant and an expansion valve (9). The heat exchanger (8) can expel heat in a variety of different ways, which introduces yet more advantageous versatility to the invention. For example, heat exchanger (8) can expel heat to air in the surrounding, e.g. outside a building, or it can expel heat to water. Water warmed by the latter can itself be used for heating purposes, e.g. residential or commercial heating.

The nature of the subcooling refrigerant is not particularly limited. This flexibility is a further advantage of the present invention because it provides the skilled person with the freedom to select based on their own preferences and the demands of the particular system they are improving. The subcooling refrigerant can be advantageously selected from the group consisting of R455A, R454C, propane, R1234yf, R152a, R1234ze, R471A, R476A and B6. These refrigerants have been found to be especially effective in the subcooling refrigeration circuit. For example, adding a subcooling refrigeration circuit using these refrigerants has been found to increase coefficient of performance by at least 30 wt,% compared with an existing refrigeration circuit (no subcooling) that uses R404A as the refrigerant. More preferably, the subcooling refrigerant is selected from R455A, R454C, R1234yf R1234ze and R471A, most preferably R455A and R454C. The subcooling refrigeration circuit, including the subcooling heat exchanger, is preferably located outside areas exposed generally to the public. E.g., if the heat transfer system is used in a commercial setting such as a supermarket, then the subcooling refrigeration circuit is generally located outside areas exposed to customers. Locating the subcooling refrigeration circuit in this way is preferably because it enhances safety when a flammable subcooling refrigerant is used.

Although the conditions of the subcooling refrigerant can vary widely, it is preferred that the subcooling temperature is in the range of 10-70° C., preferably 30-50° C., e.g. about 40° C.

Importantly, the present methods involve using a replacement refrigerant comprising: (1) at least about 50% by weight of R1234ze(E); (2) greater than 0% to about 11% of HFC-134a, HFC-134, HFC-227ea, HFC-125, and combinations of two or more of these; and (3) from about 4% to about 20% by weight of HFO-1336mzz(E), HFO-1224yd (Z), and combinations of these, wherein said replacement refrigerant: (i) has an Occupational Exposure Limit (OEL) greater than 400; (ii) is classified as class A1 by ASHRAE Standard 34; and (iii) has a GWP of about 150 or less. The following Table A identifies two replacement refrigerant blends that satisfy these criteria and provide substantial and unexpected advantage in accordance with the present invention, it being understood that the amounts in the table are considered to all be preceded by "about":

TABLE A

| | Refrigerant | |
|---|---|---|
| | A1 | A2 |
| Component | Concentration, wt. % | |
| HFO-1234ze(E) | 78.7 | 78 |
| HFO-1336mzz(E) | 17 | 12 |
| HFO-1224yd(Z) | 0 | 0 |
| HFC-227ea | 4.3 | 0 |
| HFC-134a | 0 | 10 |
| Total | 100 | 100 |
| ASHRAE Name | R-471A | R-476A |
| Properties | | |
| Normal Point, ° C. | −16.9 | −19.1 |
| Glide, ° K | 3.0 | 2.8 |
| GWP (as per AR5) | 148 | 133 |

In preferred embodiments, the replacement refrigerant is selected from within the ranges of components specified in the following Table B, it being understood that the amounts in the table are considered to all be preceded by "about":

TABLE B

| | Refrigerant | | | | | |
|---|---|---|---|---|---|---|
| | B1 | B2 | B3 | B4 | B5 | B6 |
| Component | Concentration, wt. % | | | | | |
| HFO-1234ze(E) | 70-85 | 70-85 | 70-85 | 75-85 | 75-85 | 75-85 |
| HFO-1336mzz(E) | 10-25 | 10-25 | 0-5 | 15-20 | 10-20 | 0 |
| HFO-1224yd(Z) | 0-5 | 0-5 | 4-20 | 0-5 | 0-5 | 4-20 |
| HFC-227ea | 3-4.4 | 0-5 | 0-5 | 3-4.4 | 0-5 | 0-5 |
| HFC-134a | 0-5 | 6-11 | 6-11 | 0-5 | 8-11 | 6-11 |
| Total | 100 | 100 | 100 | 100 | 100 | 100 |

The skilled person will appreciate that B4 is a narrowed version of B1, B5 is a narrowed version of B2, and B6 is a narrowed version of B6.

In preferred embodiments, the replacement refrigerant has a normal boiling point within the ranges specified in the following Table C, it being understood that the amounts in the table are considered to all be preceded by "about":

TABLE C

| | Refrigerant | | |
|---|---|---|---|
| | C1 | C2 | C3 |
| Normal Boiling Point range, ° C. | −40 to 20 | −20 to 20 | −20 to −12 |

In preferred embodiments, the replacement refrigerant has a glide within the ranges specified in the following Table D, it being understood that the amounts in the table are considered to all be preceded by "about":

TABLE D

| | Refrigerant | | |
|---|---|---|---|
| | D1 | D2 | D3 |
| Glide, ° K | <=5 | <=4 | <=3 |

An advantage of the present invention is that the method of improving the existing heat transfer system requires little or no change to the majority of the equipment forming the existing heat transfer system. Beyond the conduit that is partially or fully removed to enable installation of the subcooling heat exchanger, little or no equipment changes are required elsewhere. This is because comparable or improved thermodynamic performance is attained without having to drastically change the operating conditions of the existing refrigeration circuit. Generally, the conduits/piping, condenser, expansion valve(s), compressor(s) and the pressure seals of the system do not require changing to accommodate the present invention, which reduces the time, complexity and cost associated with improving the heat transfer system.

Reducing the number of mandatory equipment changes also frees up budget and time to make voluntary equipment changes to further enhance the system if the skilled person chooses to. For example, the skilled person can choose to improve performance of the system by increasing the level of insulation in the space cooled by the evaporator, e.g. by adding doors to refrigerated space by the at least one evaporators, such as a shop/supermarket refrigeration unit. Adding doors to a shop/supermarket refrigeration unit is particularly useful when the existing refrigerant is R448A or R404A because it helps to achieve a close match in terms of capacity. Capacity can also be enhanced when replacing R448A or R404A as the existing refrigerant by replacing the expansion valves (3, 3a) to modify the physical properties of the replacement refrigerant before entering the evaporator(s) (4, 4a).

As discussed above, the present invention also extends to heat transfer systems. These heat transfer systems can be obtained by the method of improving a heat transfer system described above, but they are not limited to those having been produced this way. The heat transfer system comprises:

(a) a first (core) refrigeration circuit comprising:
    a. a core refrigerant within the first (core) refrigeration circuit, wherein the wherein the core refrigerant comprises: (1) at least about 50% by weight of R1234ze(E); (2) greater than 0% to about 11% of HFC-134a, HFC-134, HFC-227ea, HFC-125, and combinations of two or more of these; and (3) from about 4% to about 20% by weight of HFO-1336mzz (E), HFO-1224yd(Z), and combinations of these, wherein said core refrigerant: (i) has an Occupational Exposure Limit (OEL) greater than 400; (ii) is classified as class A1 by ASHRAE Standard 34; and (iii) has a GWP of about 150 or less; and
    b. in order of refrigerant flow, at least one evaporator located in or near a refrigerated space containing products accessible to consumers, at least one compressor, at least one condenser, and at least one expansion device; and (b) a sub-cooling refrigeration circuit comprising:
    a. a subcooling refrigerant within the subcooling refrigeration circuit; and
    b. in order of refrigerant flow, a compressor, an evaporator for expelling heat from the sub-cooling refrigeration refrigerant/circuit, an expansion device, a subcooling heat exchanger and a subcooling refrigerant, wherein said subcooling heat exchange is configured to transfer heat to the subcooling refrigeration circuit from between said at least one condenser and said at least one expansion device (e.g. expansion valve) of the first (core) refrigerant circuit.

Preferred features of the method of improving heat transfer systems apply unambiguously to this heat transfer system. For example, the preferred refrigerants and operation conditions described for the method of improving heat transfer systems apply unambiguously to the heat transfer system described above since it can be obtained by such a method.

The present invention also extends to heat transfer methods using the heat transfer systems that can be obtained by the methods of improving heat transfer systems. A benefit of the improved heat transfer system is that it can be used in a variety of end uses. Especially preferred types of heat transfer systems are low- or medium-temperature refrigeration systems, preferably medium-temperature refrigeration systems. Preferred end uses are refrigeration, stationary refrigeration, commercial stationary refrigeration, e.g. in food warehouses, cold storage and food shops such as supermarket.

Refrigerant Combinations

As will be appreciated by those skilled in the art, the present invention concerns methods and systems that utilize different refrigerants for different purposes. Preferred refrigerant combinations are provided in Tables E to G below. The skilled person will appreciate that:

The methods of improving refrigeration systems concern existing refrigerants, replacement refrigerants and subcooling refrigerants.

The heat transfer systems that can result from these methods have core refrigerant (i.e. the replacement refrigerant) and a subcooling refrigerant, and heat transfer methods using these heat transfer systems have the same core and subcooling refrigerants. In other words, the 'existing refrigerant' column in Table E can be ignored when viewing refrigerant combinations for these heat transfer systems and heat transfer methods.

TABLE E

| Existing Refrigerant | Replacement (Core) Refrigerant | Subcooling Refrigerant |
|---|---|---|
| R404A | R471A | R455A |
| R404A | R471A | R454C |
| R404A | R471A | propane |
| R404A | R471A | R1234yf |
| R404A | R471A | R152a |
| R404A | R471A | R1234ze |
| R404A | R471A | R471A |
| R404A | R476A | R455A |
| R404A | R476A | R454C |
| R404A | R476A | propane |
| R404A | R476A | R1234yf |
| R404A | R476A | R152a |
| R404A | R476A | R1234ze |
| R404A | R476A | R471A |
| R404A | B1 | R455A |
| R404A | B1 | R454C |
| R404A | B1 | propane |
| R404A | B1 | R1234yf |
| R404A | B1 | R152a |
| R404A | B1 | R1234ze |
| R404A | B1 | R471A |
| R404A | B2 | R455A |
| R404A | B2 | R454C |
| R404A | B2 | propane |
| R404A | B2 | R1234yf |
| R404A | B2 | R152a |
| R404A | B2 | R1234ze |
| R404A | B2 | R471A |
| R404A | B3 | R455A |
| R404A | B3 | R454C |
| R404A | B3 | propane |
| R404A | B3 | R1234yf |
| R404A | B3 | R152a |
| R404A | B3 | R1234ze |
| R404A | B3 | R471A |
| R404A | B4 | R455A |
| R404A | B4 | R454C |
| R404A | B4 | propane |
| R404A | B4 | R1234yf |
| R404A | B4 | R152a |
| R404A | B4 | R1234ze |
| R404A | B4 | R471A |
| R404A | B5 | R455A |
| R404A | B5 | R454C |
| R404A | B5 | propane |
| R404A | B5 | R1234yf |
| R404A | B5 | R152a |
| R404A | B5 | R1234ze |
| R404A | B5 | R471A |
| R404A | B6 | R455A |
| R404A | B6 | R454C |
| R404A | B6 | propane |
| R404A | B6 | R1234yf |
| R404A | B6 | R152a |
| R404A | B6 | R1234ze |
| R404A | B6 | R471A |
| R134a | R471A | R455A |
| R134a | R471A | R454C |
| R134a | R471A | propane |
| R134a | R471A | R1234yf |
| R134a | R471A | R152a |
| R134a | R471A | R1234ze |
| R134a | R471A | R471A |
| R134a | R476A | R455A |
| R134a | R476A | R454C |
| R134a | R476A | propane |
| R134a | R476A | R1234yf |
| R134a | R476A | R152a |
| R134a | R476A | R1234ze |
| R134a | R476A | R471A |
| R134a | B1 | R455A |
| R134a | B1 | R454C |
| R134a | B1 | propane |
| R134a | B1 | R1234yf |
| R134a | B1 | R152a |
| R134a | B1 | R1234ze |
| R134a | B1 | R471A |
| R134a | B2 | R455A |
| R134a | B2 | R454C |
| R134a | B2 | propane |
| R134a | B2 | R1234yf |
| R134a | B2 | R152a |
| R134a | B2 | R1234ze |
| R134a | B2 | R471A |
| R134a | B3 | R455A |
| R134a | B3 | R454C |
| R134a | B3 | propane |
| R134a | B3 | R1234yf |
| R134a | B3 | R152a |
| R134a | B3 | R1234ze |
| R134a | B3 | R471A |
| R134a | B4 | R455A |
| R134a | B4 | R454C |
| R134a | B4 | propane |
| R134a | B4 | R1234yf |
| R134a | B4 | R152a |
| R134a | B4 | R1234ze |
| R134a | B4 | R471A |

TABLE E-continued

| Existing Refrigerant | Replacement (Core) Refrigerant | Subcooling Refrigerant |
|---|---|---|
| R134a | B5 | R455A |
| R134a | B5 | R454C |
| R134a | B5 | propane |
| R134a | B5 | R1234yf |
| R134a | B5 | R152a |
| R134a | B5 | R1234ze |
| R134a | B5 | R471A |
| R134a | B6 | R455A |
| R134a | B6 | R454C |
| R134a | B6 | propane |
| R134a | B6 | R1234yf |
| R134a | B6 | R152a |
| R134a | B6 | R1234ze |
| R134a | B6 | R471A |
| R448A | R471A | R455A |
| R448A | R471A | R454C |
| R448A | R471A | propane |
| R448A | R471A | R1234yf |
| R448A | R471A | R152a |
| R448A | R471A | R1234ze |
| R448A | R471A | R471A |
| R448A | R476A | R455A |
| R448A | R476A | R454C |
| R448A | R476A | propane |
| R448A | R476A | R1234yf |
| R448A | R476A | R152a |
| R448A | R476A | R1234ze |
| R448A | R476A | R471A |
| R448A | B1 | R455A |
| R448A | B1 | R454C |
| R448A | B1 | propane |
| R448A | B1 | R1234yf |
| R448A | B1 | R152a |
| R448A | B1 | R1234ze |
| R448A | B1 | R471A |
| R448A | B2 | R455A |
| R448A | B2 | R454C |
| R448A | B2 | propane |
| R448A | B2 | R1234yf |
| R448A | B2 | R152a |
| R448A | B2 | R1234ze |
| R448A | B2 | R471A |
| R448A | B3 | R455A |
| R448A | B3 | R454C |
| R448A | B3 | propane |
| R448A | B3 | R1234yf |
| R448A | B3 | R152a |
| R448A | B3 | R1234ze |
| R448A | B3 | R471A |
| R448A | B4 | R455A |
| R448A | B4 | R454C |
| R448A | B4 | propane |
| R448A | B4 | R1234yf |
| R448A | B4 | R152a |
| R448A | B4 | R1234ze |
| R448A | B4 | R471A |
| R448A | B5 | R455A |
| R448A | B5 | R454C |
| R448A | B5 | propane |
| R448A | B5 | R1234yf |
| R448A | B5 | R152a |
| R448A | B5 | R1234ze |
| R448A | B5 | R471A |
| R448A | B6 | R455A |
| R448A | B6 | R454C |
| R448A | B6 | propane |
| R448A | B6 | R1234yf |
| R448A | B6 | R152a |
| R448A | B6 | R1234ze |
| R448A | B6 | R471A |

TABLE F

| Existing Refrigerant | Replacement (Core) Refrigerant | Subcooling Refrigerant |
|---|---|---|
| R404A | R471A | R455A |
| R404A | R471A | R454C |
| R404A | R471A | propane |
| R404A | R471A | R1234yf |
| R404A | R471A | R152a |
| R404A | R471A | R1234ze |
| R404A | R471A | R471A |
| R407 | R471A | R455A |
| R407 | R471A | R454C |
| R407 | R471A | propane |
| R407 | R471A | R1234yf |
| R407 | R471A | R152a |
| R407 | R471A | R1234ze |
| R407 | R471A | R471A |
| R448 | R471A | R455A |
| R448 | R471A | R454C |
| R448 | R471A | propane |
| R448 | R471A | R1234yf |
| R448 | R471A | R152a |
| R448 | R471A | R1234ze |
| R448 | R471A | R471A |
| R449 | R471A | R455A |
| R449 | R471A | R454C |
| R449 | R471A | propane |
| R449 | R471A | R1234yf |
| R449 | R471A | R152a |
| R449 | R471A | R1234ze |
| R449 | R471A | R471A |
| R454 | R471A | R455A |
| R454 | R471A | R454C |
| R454 | R471A | propane |
| R454 | R471A | R1234yf |
| R454 | R471A | R152a |
| R454 | R471A | R1234ze |
| R454 | R471A | R471A |
| R513 | R471A | R455A |
| R513 | R471A | R454C |
| R513 | R471A | propane |
| R513 | R471A | R1234yf |
| R513 | R471A | R152a |
| R513 | R471A | R1234ze |
| R513 | R471A | R471A |
| R22 | R471A | R455A |
| R22 | R471A | R454C |
| R22 | R471A | propane |
| R22 | R471A | R1234yf |
| R22 | R471A | R152a |
| R22 | R471A | R1234ze |
| R22 | R471A | R471A |
| R134a | R471A | R455A |
| R134a | R471A | R454C |
| R134a | R471A | propane |
| R134a | R471A | R1234yf |
| R134a | R471A | R152a |
| R134a | R471A | R1234ze |
| R134a | R471A | R471A |
| R404A | R476A | R455A |
| R404A | R476A | R454C |
| R404A | R476A | propane |
| R404A | R476A | R1234yf |
| R404A | R476A | R152a |
| R404A | R476A | R1234ze |
| R404A | R476A | R471A |
| R407 | R476A | R455A |
| R407 | R476A | R454C |
| R407 | R476A | propane |
| R407 | R476A | R1234yf |
| R407 | R476A | R152a |
| R407 | R476A | R1234ze |
| R407 | R476A | R471A |
| R448 | R476A | R455A |
| R448 | R476A | R454C |
| R448 | R476A | propane |
| R448 | R476A | R1234yf |
| R448 | R476A | R152a |
| R448 | R476A | R1234ze |

TABLE F-continued

| Existing Refrigerant | Replacement (Core) Refrigerant | Subcooling Refrigerant |
|---|---|---|
| R448 | R476A | R471A |
| R449 | R476A | R455A |
| R449 | R476A | R454C |
| R449 | R476A | propane |
| R449 | R476A | R1234yf |
| R449 | R476A | R152a |
| R449 | R476A | R1234ze |
| R449 | R476A | R471A |
| R454 | R476A | R455A |
| R454 | R476A | R454C |
| R454 | R476A | propane |
| R454 | R476A | R1234yf |
| R454 | R476A | R152a |
| R454 | R476A | R1234ze |
| R454 | R476A | R471A |
| R513 | R476A | R455A |
| R513 | R476A | R454C |
| R513 | R476A | propane |
| R513 | R476A | R1234yf |
| R513 | R476A | R152a |
| R513 | R476A | R1234ze |
| R513 | R476A | R471A |
| R22 | R476A | R455A |
| R22 | R476A | R454C |
| R22 | R476A | propane |
| R22 | R476A | R1234yf |
| R22 | R476A | R152a |
| R22 | R476A | R1234ze |
| R22 | R476A | R471A |
| R134a | R476A | R455A |
| R134a | R476A | R454C |
| R134a | R476A | propane |
| R134a | R476A | R1234yf |
| R134a | R476A | R152a |
| R134a | R476A | R1234ze |
| R134a | R476A | R471A |
| R404A | B6 | R455A |
| R404A | B6 | R454C |
| R404A | B6 | propane |
| R404A | B6 | R1234yf |
| R404A | B6 | R152a |
| R404A | B6 | R1234ze |
| R404A | B6 | R471A |
| R407 | B6 | R455A |
| R407 | B6 | R454C |
| R407 | B6 | propane |
| R407 | B6 | R1234yf |
| R407 | B6 | R152a |
| R407 | B6 | R1234ze |
| R407 | B6 | R471A |
| R448 | B6 | R455A |
| R448 | B6 | R454C |
| R448 | B6 | propane |
| R448 | B6 | R1234yf |
| R448 | B6 | R152a |
| R448 | B6 | R1234ze |
| R448 | B6 | R471A |
| R449 | B6 | R455A |
| R449 | B6 | R454C |
| R449 | B6 | propane |
| R449 | B6 | R1234yf |
| R449 | B6 | R152a |
| R449 | B6 | R1234ze |
| R449 | B6 | R471A |
| R454 | B6 | R455A |
| R454 | B6 | R454C |
| R454 | B6 | propane |
| R454 | B6 | R1234yf |
| R454 | B6 | R152a |
| R454 | B6 | R1234ze |
| R454 | B6 | R471A |
| R513 | B6 | R455A |
| R513 | B6 | R454C |
| R513 | B6 | propane |
| R513 | B6 | R1234yf |
| R513 | B6 | R152a |
| R513 | B6 | R1234ze |
| R513 | B6 | R471A |
| R22 | B6 | R455A |
| R22 | B6 | R454C |
| R22 | B6 | propane |
| R22 | B6 | R1234yf |
| R22 | B6 | R152a |
| R22 | B6 | R1234ze |
| R22 | B6 | R471A |
| R134a | B6 | R455A |
| R134a | B6 | R454C |
| R134a | B6 | propane |
| R134a | B6 | R1234yf |
| R134a | B6 | R152a |
| R134a | B6 | R1234ze |
| R134a | B6 | R471A |

TABLE G

| Existing Refrigerant | Replacement (Core) Refrigerant | Subcooling Refrigerant |
|---|---|---|
| R404A | R471A | R455A |
| R404A | R476A | R455A |
| R404A | B1 | R455A |
| R404A | B2 | R455A |
| R404A | B3 | R455A |
| R404A | B4 | R455A |
| R404A | B5 | R455A |
| R404A | B6 | R455A |
| R407 | R471A | R455A |
| R407 | R476A | R455A |
| R407 | B1 | R455A |
| R407 | B2 | R455A |
| R407 | B3 | R455A |
| R407 | B4 | R455A |
| R407 | B5 | R455A |
| R407 | B6 | R455A |
| R448 | R471A | R455A |
| R448 | R476A | R455A |
| R448 | B1 | R455A |
| R448 | B2 | R455A |
| R448 | B3 | R455A |
| R448 | B4 | R455A |
| R448 | B5 | R455A |
| R448 | B6 | R455A |
| R449 | R471A | R455A |
| R449 | R476A | R455A |
| R449 | B1 | R455A |
| R449 | B2 | R455A |
| R449 | B3 | R455A |
| R449 | B4 | R455A |
| R449 | B5 | R455A |
| R449 | B6 | R455A |
| R454 | R471A | R455A |
| R454 | R476A | R455A |
| R454 | B1 | R455A |
| R454 | B2 | R455A |
| R454 | B3 | R455A |
| R454 | B4 | R455A |
| R454 | B5 | R455A |
| R454 | B6 | R455A |
| R513 | R471A | R455A |
| R513 | R476A | R455A |
| R513 | B1 | R455A |
| R513 | B2 | R455A |
| R513 | B3 | R455A |
| R513 | B4 | R455A |
| R513 | B5 | R455A |
| R513 | B6 | R455A |
| R22 | R471A | R455A |
| R22 | R476A | R455A |

TABLE G-continued

| Existing Refrigerant | Replacement (Core) Refrigerant | Subcooling Refrigerant |
|---|---|---|
| R22 | B1 | R455A |
| R22 | B2 | R455A |
| R22 | B3 | R455A |
| R22 | B4 | R455A |
| R22 | B5 | R455A |
| R22 | B6 | R455A |
| R134a | R471A | R455A |
| R134a | R476A | R455A |
| R134a | B1 | R455A |
| R134a | B2 | R455A |
| R134a | B3 | R455A |
| R134a | B4 | R455A |
| R134a | B5 | R455A |
| R134a | B6 | R455A |
| R404A | R471A | R454C |
| R404A | R476A | R454C |
| R404A | B1 | R454C |
| R404A | B2 | R454C |
| R404A | B3 | R454C |
| R404A | B4 | R454C |
| R404A | B5 | R454C |
| R404A | B6 | R454C |
| R407 | R471A | R454C |
| R407 | R476A | R454C |
| R407 | B1 | R454C |
| R407 | B2 | R454C |
| R407 | B3 | R454C |
| R407 | B4 | R454C |
| R407 | B5 | R454C |
| R407 | B6 | R454C |
| R448 | R471A | R454C |
| R448 | R476A | R454C |
| R448 | B1 | R454C |
| R448 | B2 | R454C |
| R448 | B3 | R454C |
| R448 | B4 | R454C |
| R448 | B5 | R454C |
| R448 | B6 | R454C |
| R449 | R471A | R454C |
| R449 | R476A | R454C |
| R449 | B1 | R454C |
| R449 | B2 | R454C |
| R449 | B3 | R454C |
| R449 | B4 | R454C |
| R449 | B5 | R454C |
| R449 | B6 | R454C |
| R454 | R471A | R454C |
| R454 | R476A | R454C |
| R454 | B1 | R454C |
| R454 | B2 | R454C |
| R454 | B3 | R454C |
| R454 | B4 | R454C |
| R454 | B5 | R454C |
| R454 | B6 | R454C |
| R513 | R471A | R454C |
| R513 | R476A | R454C |
| R513 | B1 | R454C |
| R513 | B2 | R454C |
| R513 | B3 | R454C |
| R513 | B4 | R454C |
| R513 | B5 | R454C |
| R513 | B6 | R454C |
| R22 | R471A | R454C |
| R22 | R476A | R454C |
| R22 | B1 | R454C |
| R22 | B2 | R454C |
| R22 | B3 | R454C |
| R22 | B4 | R454C |
| R22 | B5 | R454C |
| R22 | B6 | R454C |
| R134a | R471A | R454C |
| R134a | R476A | R454C |
| R134a | B1 | R454C |
| R134a | B2 | R454C |
| R134a | B3 | R454C |
| R134a | B4 | R454C |
| R134a | B5 | R454C |
| R134a | B6 | R454C |
| R404A | R471A | R1234yf |
| R404A | R476A | R1234yf |
| R404A | B1 | R1234yf |
| R404A | B2 | R1234yf |
| R404A | B3 | R1234yf |
| R404A | B4 | R1234yf |
| R404A | B5 | R1234yf |
| R404A | B6 | R1234yf |
| R407 | R471A | R1234yf |
| R407 | R476A | R1234yf |
| R407 | B1 | R1234yf |
| R407 | B2 | R1234yf |
| R407 | B3 | R1234yf |
| R407 | B4 | R1234yf |
| R407 | B5 | R1234yf |
| R407 | B6 | R1234yf |
| R448 | R471A | R1234yf |
| R448 | R476A | R1234yf |
| R448 | B1 | R1234yf |
| R448 | B2 | R1234yf |
| R448 | B3 | R1234yf |
| R448 | B4 | R1234yf |
| R448 | B5 | R1234yf |
| R448 | B6 | R1234yf |
| R449 | R471A | R1234yf |
| R449 | R476A | R1234yf |
| R449 | B1 | R1234yf |
| R449 | B2 | R1234yf |
| R449 | B3 | R1234yf |
| R449 | B4 | R1234yf |
| R449 | B5 | R1234yf |
| R449 | B6 | R1234yf |
| R454 | R471A | R1234yf |
| R454 | R476A | R1234yf |
| R454 | B1 | R1234yf |
| R454 | B2 | R1234yf |
| R454 | B3 | R1234yf |
| R454 | B4 | R1234yf |
| R454 | B5 | R1234yf |
| R454 | B6 | R1234yf |
| R513 | R471A | R1234yf |
| R513 | R476A | R1234yf |
| R513 | B1 | R1234yf |
| R513 | B2 | R1234yf |
| R513 | B3 | R1234yf |
| R513 | B4 | R1234yf |
| R513 | B5 | R1234yf |
| R513 | B6 | R1234yf |
| R22 | R471A | R1234yf |
| R22 | R476A | R1234yf |
| R22 | B1 | R1234yf |
| R22 | B2 | R1234yf |
| R22 | B3 | R1234yf |
| R22 | B4 | R1234yf |
| R22 | B5 | R1234yf |
| R22 | B6 | R1234yf |
| R134a | R471A | R1234yf |
| R134a | R476A | R1234yf |
| R134a | B1 | R1234yf |
| R134a | B2 | R1234yf |
| R134a | B3 | R1234yf |
| R134a | B4 | R1234yf |
| R134a | B5 | R1234yf |
| R134a | B6 | R1234yf |
| R404A | R471A | R1234ze |
| R404A | R476A | R1234ze |
| R404A | B1 | R1234ze |
| R404A | B2 | R1234ze |
| R404A | B3 | R1234ze |
| R404A | B4 | R1234ze |
| R404A | B5 | R1234ze |
| R404A | B6 | R1234ze |
| R407 | R471A | R1234ze |
| R407 | R476A | R1234ze |

TABLE G-continued

| Existing Refrigerant | Replacement (Core) Refrigerant | Subcooling Refrigerant |
|---|---|---|
| R407 | B1 | R1234ze |
| R407 | B2 | R1234ze |
| R407 | B3 | R1234ze |
| R407 | B4 | R1234ze |
| R407 | B5 | R1234ze |
| R407 | B6 | R1234ze |
| R448 | R471A | R1234ze |
| R448 | R476A | R1234ze |
| R448 | B1 | R1234ze |
| R448 | B2 | R1234ze |
| R448 | B3 | R1234ze |
| R448 | B4 | R1234ze |
| R448 | B5 | R1234ze |
| R448 | B6 | R1234ze |
| R449 | R471A | R1234ze |
| R449 | R476A | R1234ze |
| R449 | B1 | R1234ze |
| R449 | B2 | R1234ze |
| R449 | B3 | R1234ze |
| R449 | B4 | R1234ze |
| R449 | B5 | R1234ze |
| R449 | B6 | R1234ze |
| R454 | R471A | R1234ze |
| R454 | R476A | R1234ze |
| R454 | B1 | R1234ze |
| R454 | B2 | R1234ze |
| R454 | B3 | R1234ze |
| R454 | B4 | R1234ze |
| R454 | B5 | R1234ze |
| R454 | B6 | R1234ze |
| R513 | R471A | R1234ze |
| R513 | R476A | R1234ze |
| R513 | B1 | R1234ze |
| R513 | B2 | R1234ze |
| R513 | B3 | R1234ze |
| R513 | B4 | R1234ze |
| R513 | B5 | R1234ze |
| R513 | B6 | R1234ze |
| R22 | R471A | R1234ze |
| R22 | R476A | R1234ze |
| R22 | B1 | R1234ze |
| R22 | B2 | R1234ze |
| R22 | B3 | R1234ze |
| R22 | B4 | R1234ze |
| R22 | B5 | R1234ze |
| R22 | B6 | R1234ze |
| R134a | R471A | R1234ze |
| R134a | R476A | R1234ze |
| R134a | B1 | R1234ze |
| R134a | B2 | R1234ze |
| R134a | B3 | R1234ze |
| R134a | B4 | R1234ze |
| R134a | B5 | R1234ze |
| R134a | B6 | R1234ze |

The skilled person will also appreciate that it is advantageous to include a compressor lubricant in combination with the replacement/core refrigerant and/or the subcooling refrigerant. Useful compressor lubricants include polyol esters (POEs), mineral oil, alkylbenzenes (ABs), polyvinyl ethers (PVE), poly(alkylene glycols) (PAGs), and poly(alpha-olefins) (PAO). The skilled person will therefore appreciate that the combinations of features in Tables H and I are also advantageous.

TABLE H

| Existing Refrigerant | Replacement (Core) Refrigerant | Lubricant with Replacement (Core) Refrigerant | Subcooling Refrigerant |
|---|---|---|---|
| R404A | R471A | PVE | R455A |
| R404A | R471A | PVE | R454C |
| R404A | R471A | PVE | propane |
| R404A | R471A | PVE | R1234yf |
| R404A | R471A | PVE | R152a |
| R404A | R471A | PVE | R1234ze |
| R404A | R471A | PVE | R471A |
| R407 | R471A | PVE | R455A |
| R407 | R471A | PVE | R454C |
| R407 | R471A | PVE | propane |
| R407 | R471A | PVE | R1234yf |
| R407 | R471A | PVE | R152a |
| R407 | R471A | PVE | R1234ze |
| R407 | R471A | PVE | R471A |
| R448 | R471A | PVE | R455A |
| R448 | R471A | PVE | R454C |
| R448 | R471A | PVE | propane |
| R448 | R471A | PVE | R1234yf |
| R448 | R471A | PVE | R152a |
| R448 | R471A | PVE | R1234ze |
| R448 | R471A | PVE | R471A |
| R449 | R471A | PVE | R455A |
| R449 | R471A | PVE | R454C |
| R449 | R471A | PVE | propane |
| R449 | R471A | PVE | R1234yf |
| R449 | R471A | PVE | R152a |
| R449 | R471A | PVE | R1234ze |
| R449 | R471A | PVE | R471A |
| R454 | R471A | PVE | R455A |
| R454 | R471A | PVE | R454C |
| R454 | R471A | PVE | propane |
| R454 | R471A | PVE | R1234yf |
| R454 | R471A | PVE | R152a |
| R454 | R471A | PVE | R1234ze |
| R454 | R471A | PVE | R471A |
| R513 | R471A | PVE | R455A |
| R513 | R471A | PVE | R454C |
| R513 | R471A | PVE | propane |
| R513 | R471A | PVE | R1234yf |
| R513 | R471A | PVE | R152a |
| R513 | R471A | PVE | R1234ze |
| R513 | R471A | PVE | R471A |
| R22 | R471A | PVE | R455A |
| R22 | R471A | PVE | R454C |
| R22 | R471A | PVE | propane |
| R22 | R471A | PVE | R1234yf |
| R22 | R471A | PVE | R152a |
| R22 | R471A | PVE | R1234ze |
| R22 | R471A | PVE | R471A |
| R134a | R471A | PVE | R455A |
| R134a | R471A | PVE | R454C |
| R134a | R471A | PVE | propane |
| R134a | R471A | PVE | R1234yf |
| R134a | R471A | PVE | R152a |
| R134a | R471A | PVE | R1234ze |
| R134a | R471A | PVE | R471A |
| R404A | R476A | PVE | R455A |
| R404A | R476A | PVE | R454C |
| R404A | R476A | PVE | propane |
| R404A | R476A | PVE | R1234yf |
| R404A | R476A | PVE | R152a |
| R404A | R476A | PVE | R1234ze |
| R404A | R476A | PVE | R471A |
| R407 | R476A | PVE | R455A |
| R407 | R476A | PVE | R454C |
| R407 | R476A | PVE | propane |
| R407 | R476A | PVE | R1234yf |
| R407 | R476A | PVE | R152a |
| R407 | R476A | PVE | R1234ze |
| R407 | R476A | PVE | R471A |
| R448 | R476A | PVE | R455A |
| R448 | R476A | PVE | R454C |
| R448 | R476A | PVE | propane |
| R448 | R476A | PVE | R1234yf |
| R448 | R476A | PVE | R152a |
| R448 | R476A | PVE | R1234ze |
| R448 | R476A | PVE | R471A |
| R449 | R476A | PVE | R455A |

TABLE H-continued

| Existing Refrigerant | Replacement (Core) Refrigerant | Lubricant with Replacement (Core) Refrigerant | Subcooling Refrigerant |
|---|---|---|---|
| R449 | R476A | PVE | R454C |
| R449 | R476A | PVE | propane |
| R449 | R476A | PVE | R1234yf |
| R449 | R476A | PVE | R152a |
| R449 | R476A | PVE | R1234ze |
| R449 | R476A | PVE | R471A |
| R454 | R476A | PVE | R455A |
| R454 | R476A | PVE | R454C |
| R454 | R476A | PVE | propane |
| R454 | R476A | PVE | R1234yf |
| R454 | R476A | PVE | R152a |
| R454 | R476A | PVE | R1234ze |
| R454 | R476A | PVE | R471A |
| R513 | R476A | PVE | R455A |
| R513 | R476A | PVE | R454C |
| R513 | R476A | PVE | propane |
| R513 | R476A | PVE | R1234yf |
| R513 | R476A | PVE | R152a |
| R513 | R476A | PVE | R1234ze |
| R513 | R476A | PVE | R471A |
| R22 | R476A | PVE | R455A |
| R22 | R476A | PVE | R454C |
| R22 | R476A | PVE | propane |
| R22 | R476A | PVE | R1234yf |
| R22 | R476A | PVE | R152a |
| R22 | R476A | PVE | R1234ze |
| R22 | R476A | PVE | R471A |
| R134a | R476A | PVE | R455A |
| R134a | R476A | PVE | R454C |
| R134a | R476A | PVE | propane |
| R134a | R476A | PVE | R1234yf |
| R134a | R476A | PVE | R152a |
| R134a | R476A | PVE | R1234ze |
| R134a | R476A | PVE | R471A |
| R404A | B6 | PVE | R455A |
| R404A | B6 | PVE | R454C |
| R404A | B6 | PVE | propane |
| R404A | B6 | PVE | R1234yf |
| R404A | B6 | PVE | R152a |
| R404A | B6 | PVE | R1234ze |
| R404A | B6 | PVE | R471A |
| R407 | B6 | PVE | R455A |
| R407 | B6 | PVE | R454C |
| R407 | B6 | PVE | propane |
| R407 | B6 | PVE | R1234yf |
| R407 | B6 | PVE | R152a |
| R407 | B6 | PVE | R1234ze |
| R407 | B6 | PVE | R471A |
| R448 | B6 | PVE | R455A |
| R448 | B6 | PVE | R454C |
| R448 | B6 | PVE | propane |
| R448 | B6 | PVE | R1234yf |
| R448 | B6 | PVE | R152a |
| R448 | B6 | PVE | R1234ze |
| R448 | B6 | PVE | R471A |
| R449 | B6 | PVE | R455A |
| R449 | B6 | PVE | R454C |
| R449 | B6 | PVE | propane |
| R449 | B6 | PVE | R1234yf |
| R449 | B6 | PVE | R152a |
| R449 | B6 | PVE | R1234ze |
| R449 | B6 | PVE | R471A |
| R454 | B6 | PVE | R455A |
| R454 | B6 | PVE | R454C |
| R454 | B6 | PVE | propane |
| R454 | B6 | PVE | R1234yf |
| R454 | B6 | PVE | R152a |
| R454 | B6 | PVE | R1234ze |
| R454 | B6 | PVE | R471A |
| R513 | B6 | PVE | R455A |
| R513 | B6 | PVE | R454C |
| R513 | B6 | PVE | propane |
| R513 | B6 | PVE | R1234yf |
| R513 | B6 | PVE | R152a |
| R513 | B6 | PVE | R1234ze |
| R513 | B6 | PVE | R471A |
| R22 | B6 | PVE | R455A |
| R22 | B6 | PVE | R454C |
| R22 | B6 | PVE | propane |
| R22 | B6 | PVE | R1234yf |
| R22 | B6 | PVE | R152a |
| R22 | B6 | PVE | R1234ze |
| R22 | B6 | PVE | R471A |
| R134a | B6 | PVE | R455A |
| R134a | B6 | PVE | R454C |
| R134a | B6 | PVE | propane |
| R134a | B6 | PVE | R1234yf |
| R134a | B6 | PVE | R152a |
| R134a | B6 | PVE | R1234ze |
| R134a | B6 | PVE | R471A |
| R404A | R471A | PAG | R455A |
| R404A | R471A | PAG | R454C |
| R404A | R471A | PAG | propane |
| R404A | R471A | PAG | R1234yf |
| R404A | R471A | PAG | R152a |
| R404A | R471A | PAG | R1234ze |
| R404A | R471A | PAG | R471A |
| R407 | R471A | PAG | R455A |
| R407 | R471A | PAG | R454C |
| R407 | R471A | PAG | propane |
| R407 | R471A | PAG | R1234yf |
| R407 | R471A | PAG | R152a |
| R407 | R471A | PAG | R1234ze |
| R407 | R471A | PAG | R471A |
| R448 | R471A | PAG | R455A |
| R448 | R471A | PAG | R454C |
| R448 | R471A | PAG | propane |
| R448 | R471A | PAG | R1234yf |
| R448 | R471A | PAG | R152a |
| R448 | R471A | PAG | R1234ze |
| R448 | R471A | PAG | R471A |
| R449 | R471A | PAG | R455A |
| R449 | R471A | PAG | R454C |
| R449 | R471A | PAG | propane |
| R449 | R471A | PAG | R1234yf |
| R449 | R471A | PAG | R152a |
| R449 | R471A | PAG | R1234ze |
| R449 | R471A | PAG | R471A |
| R454 | R471A | PAG | R455A |
| R454 | R471A | PAG | R454C |
| R454 | R471A | PAG | propane |
| R454 | R471A | PAG | R1234yf |
| R454 | R471A | PAG | R152a |
| R454 | R471A | PAG | R1234ze |
| R454 | R471A | PAG | R471A |
| R513 | R471A | PAG | R455A |
| R513 | R471A | PAG | R454C |
| R513 | R471A | PAG | propane |
| R513 | R471A | PAG | R1234yf |
| R513 | R471A | PAG | R152a |
| R513 | R471A | PAG | R1234ze |
| R513 | R471A | PAG | R471A |
| R22 | R471A | PAG | R455A |
| R22 | R471A | PAG | R454C |
| R22 | R471A | PAG | propane |
| R22 | R471A | PAG | R1234yf |
| R22 | R471A | PAG | R152a |
| R22 | R471A | PAG | R1234ze |
| R22 | R471A | PAG | R471A |
| R134a | R471A | PAG | R455A |
| R134a | R471A | PAG | R454C |
| R134a | R471A | PAG | propane |
| R134a | R471A | PAG | R1234yf |
| R134a | R471A | PAG | R152a |
| R134a | R471A | PAG | R1234ze |
| R134a | R471A | PAG | R471A |
| R404A | R476A | PAG | R455A |
| R404A | R476A | PAG | R454C |
| R404A | R476A | PAG | propane |
| R404A | R476A | PAG | R1234yf |
| R404A | R476A | PAG | R152a |
| R404A | R476A | PAG | R1234ze |

TABLE H-continued

| Existing Refrigerant | Replacement (Core) Refrigerant | Lubricant with Replacement (Core) Refrigerant | Subcooling Refrigerant |
|---|---|---|---|
| R404A | R476A | PAG | R471A |
| R407 | R476A | PAG | R455A |
| R407 | R476A | PAG | R454C |
| R407 | R476A | PAG | propane |
| R407 | R476A | PAG | R1234yf |
| R407 | R476A | PAG | R152a |
| R407 | R476A | PAG | R1234ze |
| R407 | R476A | PAG | R471A |
| R448 | R476A | PAG | R455A |
| R448 | R476A | PAG | R454C |
| R448 | R476A | PAG | propane |
| R448 | R476A | PAG | R1234yf |
| R448 | R476A | PAG | R152a |
| R448 | R476A | PAG | R1234ze |
| R448 | R476A | PAG | R471A |
| R449 | R476A | PAG | R455A |
| R449 | R476A | PAG | R454C |
| R449 | R476A | PAG | propane |
| R449 | R476A | PAG | R1234yf |
| R449 | R476A | PAG | R152a |
| R449 | R476A | PAG | R1234ze |
| R449 | R476A | PAG | R471A |
| R454 | R476A | PAG | R455A |
| R454 | R476A | PAG | R454C |
| R454 | R476A | PAG | propane |
| R454 | R476A | PAG | R1234yf |
| R454 | R476A | PAG | R152a |
| R454 | R476A | PAG | R1234ze |
| R454 | R476A | PAG | R471A |
| R513 | R476A | PAG | R455A |
| R513 | R476A | PAG | R454C |
| R513 | R476A | PAG | propane |
| R513 | R476A | PAG | R1234yf |
| R513 | R476A | PAG | R152a |
| R513 | R476A | PAG | R1234ze |
| R513 | R476A | PAG | R471A |
| R22 | R476A | PAG | R455A |
| R22 | R476A | PAG | R454C |
| R22 | R476A | PAG | propane |
| R22 | R476A | PAG | R1234yf |
| R22 | R476A | PAG | R152a |
| R22 | R476A | PAG | R1234ze |
| R22 | R476A | PAG | R471A |
| R134a | R476A | PAG | R455A |
| R134a | R476A | PAG | R454C |
| R134a | R476A | PAG | propane |
| R134a | R476A | PAG | R1234yf |
| R134a | R476A | PAG | R152a |
| R134a | R476A | PAG | R1234ze |
| R134a | R476A | PAG | R471A |
| R404A | B6 | PAG | R455A |
| R404A | B6 | PAG | R454C |
| R404A | B6 | PAG | propane |
| R404A | B6 | PAG | R1234yf |
| R404A | B6 | PAG | R152a |
| R404A | B6 | PAG | R1234ze |
| R404A | B6 | PAG | R471A |
| R407 | B6 | PAG | R455A |
| R407 | B6 | PAG | R454C |
| R407 | B6 | PAG | propane |
| R407 | B6 | PAG | R1234yf |
| R407 | B6 | PAG | R152a |
| R407 | B6 | PAG | R1234ze |
| R407 | B6 | PAG | R471A |
| R448 | B6 | PAG | R455A |
| R448 | B6 | PAG | R454C |
| R448 | B6 | PAG | propane |
| R448 | B6 | PAG | R1234yf |
| R448 | B6 | PAG | R152a |
| R448 | B6 | PAG | R1234ze |
| R448 | B6 | PAG | R471A |
| R449 | B6 | PAG | R455A |
| R449 | B6 | PAG | R454C |
| R449 | B6 | PAG | propane |
| R449 | B6 | PAG | R1234yf |
| R449 | B6 | PAG | R152a |
| R449 | B6 | PAG | R1234ze |
| R449 | B6 | PAG | R471A |
| R454 | B6 | PAG | R455A |
| R454 | B6 | PAG | R454C |
| R454 | B6 | PAG | propane |
| R454 | B6 | PAG | R1234yf |
| R454 | B6 | PAG | R152a |
| R454 | B6 | PAG | R1234ze |
| R454 | B6 | PAG | R471A |
| R513 | B6 | PAG | R455A |
| R513 | B6 | PAG | R454C |
| R513 | B6 | PAG | propane |
| R513 | B6 | PAG | R1234yf |
| R513 | B6 | PAG | R152a |
| R513 | B6 | PAG | R1234ze |
| R513 | B6 | PAG | R471A |
| R22 | B6 | PAG | R455A |
| R22 | B6 | PAG | R454C |
| R22 | B6 | PAG | propane |
| R22 | B6 | PAG | R1234yf |
| R22 | B6 | PAG | R152a |
| R22 | B6 | PAG | R1234ze |
| R22 | B6 | PAG | R471A |
| R134a | B6 | PAG | R455A |
| R134a | B6 | PAG | R454C |
| R134a | B6 | PAG | propane |
| R134a | B6 | PAG | R1234yf |
| R134a | B6 | PAG | R152a |
| R134a | B6 | PAG | R1234ze |
| R134a | B6 | PAG | R471A |
| R404A | R471A | POE | R455A |
| R404A | R471A | POE | R454C |
| R404A | R471A | POE | propane |
| R404A | R471A | POE | R1234yf |
| R404A | R471A | POE | R152a |
| R404A | R471A | POE | R1234ze |
| R404A | R471A | POE | R471A |
| R407 | R471A | POE | R455A |
| R407 | R471A | POE | R454C |
| R407 | R471A | POE | propane |
| R407 | R471A | POE | R1234yf |
| R407 | R471A | POE | R152a |
| R407 | R471A | POE | R1234ze |
| R407 | R471A | POE | R471A |
| R448 | R471A | POE | R455A |
| R448 | R471A | POE | R454C |
| R448 | R471A | POE | propane |
| R448 | R471A | POE | R1234yf |
| R448 | R471A | POE | R152a |
| R448 | R471A | POE | R1234ze |
| R448 | R471A | POE | R471A |
| R449 | R471A | POE | R455A |
| R449 | R471A | POE | R454C |
| R449 | R471A | POE | propane |
| R449 | R471A | POE | R1234yf |
| R449 | R471A | POE | R152a |
| R449 | R471A | POE | R1234ze |
| R449 | R471A | POE | R471A |
| R454 | R471A | POE | R455A |
| R454 | R471A | POE | R454C |
| R454 | R471A | POE | propane |
| R454 | R471A | POE | R1234yf |
| R454 | R471A | POE | R152a |
| R454 | R471A | POE | R1234ze |
| R454 | R471A | POE | R471A |
| R513 | R471A | POE | R455A |
| R513 | R471A | POE | R454C |
| R513 | R471A | POE | propane |
| R513 | R471A | POE | R1234yf |
| R513 | R471A | POE | R152a |
| R513 | R471A | POE | R1234ze |
| R513 | R471A | POE | R471A |
| R22 | R471A | POE | R455A |
| R22 | R471A | POE | R454C |
| R22 | R471A | POE | propane |
| R22 | R471A | POE | R1234yf |

TABLE H-continued

| Existing Refrigerant | Replacement (Core) Refrigerant | Lubricant with Replacement (Core) Refrigerant | Subcooling Refrigerant |
|---|---|---|---|
| R22 | R471A | POE | R152a |
| R22 | R471A | POE | R1234ze |
| R22 | R471A | POE | R471A |
| R134a | R471A | POE | R455A |
| R134a | R471A | POE | R454C |
| R134a | R471A | POE | propane |
| R134a | R471A | POE | R1234yf |
| R134a | R471A | POE | R152a |
| R134a | R471A | POE | R1234ze |
| R134a | R471A | POE | R471A |
| R404A | R476A | POE | R455A |
| R404A | R476A | POE | R454C |
| R404A | R476A | POE | propane |
| R404A | R476A | POE | R1234yf |
| R404A | R476A | POE | R152a |
| R404A | R476A | POE | R1234ze |
| R404A | R476A | POE | R471A |
| R407 | R476A | POE | R455A |
| R407 | R476A | POE | R454C |
| R407 | R476A | POE | propane |
| R407 | R476A | POE | R1234yf |
| R407 | R476A | POE | R152a |
| R407 | R476A | POE | R1234ze |
| R407 | R476A | POE | R471A |
| R448 | R476A | POE | R455A |
| R448 | R476A | POE | R454C |
| R448 | R476A | POE | propane |
| R448 | R476A | POE | R1234yf |
| R448 | R476A | POE | R152a |
| R448 | R476A | POE | R1234ze |
| R448 | R476A | POE | R471A |
| R449 | R476A | POE | R455A |
| R449 | R476A | POE | R454C |
| R449 | R476A | POE | propane |
| R449 | R476A | POE | R1234yf |
| R449 | R476A | POE | R152a |
| R449 | R476A | POE | R1234ze |
| R449 | R476A | POE | R471A |
| R454 | R476A | POE | R455A |
| R454 | R476A | POE | R454C |
| R454 | R476A | POE | propane |
| R454 | R476A | POE | R1234yf |
| R454 | R476A | POE | R152a |
| R454 | R476A | POE | R1234ze |
| R454 | R476A | POE | R471A |
| R513 | R476A | POE | R455A |
| R513 | R476A | POE | R454C |
| R513 | R476A | POE | propane |
| R513 | R476A | POE | R1234yf |
| R513 | R476A | POE | R152a |
| R513 | R476A | POE | R1234ze |
| R513 | R476A | POE | R471A |
| R22 | R476A | POE | R455A |
| R22 | R476A | POE | R454C |
| R22 | R476A | POE | propane |
| R22 | R476A | POE | R1234yf |
| R22 | R476A | POE | R152a |
| R22 | R476A | POE | R1234ze |
| R22 | R476A | POE | R471A |
| R134a | R476A | POE | R455A |
| R134a | R476A | POE | R454C |
| R134a | R476A | POE | propane |
| R134a | R476A | POE | R1234yf |
| R134a | R476A | POE | R152a |
| R134a | R476A | POE | R1234ze |
| R134a | R476A | POE | R471A |
| R404A | B6 | POE | R455A |
| R404A | B6 | POE | R454C |
| R404A | B6 | POE | propane |
| R404A | B6 | POE | R1234yf |
| R404A | B6 | POE | R152a |
| R404A | B6 | POE | R1234ze |
| R404A | B6 | POE | R471A |
| R407 | B6 | POE | R455A |
| R407 | B6 | POE | R454C |
| R407 | B6 | POE | propane |
| R407 | B6 | POE | R1234yf |
| R407 | B6 | POE | R152a |
| R407 | B6 | POE | R1234ze |
| R407 | B6 | POE | R471A |
| R448 | B6 | POE | R455A |
| R448 | B6 | POE | R454C |
| R448 | B6 | POE | propane |
| R448 | B6 | POE | R1234yf |
| R448 | B6 | POE | R152a |
| R448 | B6 | POE | R1234ze |
| R448 | B6 | POE | R471A |
| R449 | B6 | POE | R455A |
| R449 | B6 | POE | R454C |
| R449 | B6 | POE | propane |
| R449 | B6 | POE | R1234yf |
| R449 | B6 | POE | R152a |
| R449 | B6 | POE | R1234ze |
| R449 | B6 | POE | R471A |
| R454 | B6 | POE | R455A |
| R454 | B6 | POE | R454C |
| R454 | B6 | POE | propane |
| R454 | B6 | POE | R1234yf |
| R454 | B6 | POE | R152a |
| R454 | B6 | POE | R1234ze |
| R454 | B6 | POE | R471A |
| R513 | B6 | POE | R455A |
| R513 | B6 | POE | R454C |
| R513 | B6 | POE | propane |
| R513 | B6 | POE | R1234yf |
| R513 | B6 | POE | R152a |
| R513 | B6 | POE | R1234ze |
| R513 | B6 | POE | R471A |
| R22 | B6 | POE | R455A |
| R22 | B6 | POE | R454C |
| R22 | B6 | POE | propane |
| R22 | B6 | POE | R1234yf |
| R22 | B6 | POE | R152a |
| R22 | B6 | POE | R1234ze |
| R22 | B6 | POE | R471A |
| R134a | B6 | POE | R455A |
| R134a | B6 | POE | R454C |
| R134a | B6 | POE | propane |
| R134a | B6 | POE | R1234yf |
| R134a | B6 | POE | R152a |
| R134a | B6 | POE | R1234ze |
| R134a | B6 | POE | R471A |

TABLE I

| Existing Refrigerant | Replacement (Core) Refrigerant | Subcooling Refrigerant | Lubricant with Subcooling Refrigerant |
|---|---|---|---|
| R404A | R471A | R455A | PVE |
| R404A | R476A | R455A | PVE |
| R404A | B1 | R455A | PVE |
| R404A | B2 | R455A | PVE |
| R404A | B3 | R455A | PVE |
| R404A | B4 | R455A | PVE |
| R404A | B5 | R455A | PVE |
| R404A | B6 | R455A | PVE |
| R407 | R471A | R455A | PVE |
| R407 | R476A | R455A | PVE |
| R407 | B1 | R455A | PVE |
| R407 | B2 | R455A | PVE |
| R407 | B3 | R455A | PVE |
| R407 | B4 | R455A | PVE |
| R407 | B5 | R455A | PVE |
| R407 | B6 | R455A | PVE |
| R448 | R471A | R455A | PVE |
| R448 | R476A | R455A | PVE |
| R448 | B1 | R455A | PVE |
| R448 | B2 | R455A | PVE |

TABLE I-continued

| Existing Refrigerant | Replacement (Core) Refrigerant | Subcooling Refrigerant | Lubricant with Subcooling Refrigerant |
|---|---|---|---|
| R448 | B3 | R455A | PVE |
| R448 | B4 | R455A | PVE |
| R448 | B5 | R455A | PVE |
| R448 | B6 | R455A | PVE |
| R449 | R471A | R455A | PVE |
| R449 | R476A | R455A | PVE |
| R449 | B1 | R455A | PVE |
| R449 | B2 | R455A | PVE |
| R449 | B3 | R455A | PVE |
| R449 | B4 | R455A | PVE |
| R449 | B5 | R455A | PVE |
| R449 | B6 | R455A | PVE |
| R454 | R471A | R455A | PVE |
| R454 | R476A | R455A | PVE |
| R454 | B1 | R455A | PVE |
| R454 | B2 | R455A | PVE |
| R454 | B3 | R455A | PVE |
| R454 | B4 | R455A | PVE |
| R454 | B5 | R455A | PVE |
| R454 | B6 | R455A | PVE |
| R513 | R471A | R455A | PVE |
| R513 | R476A | R455A | PVE |
| R513 | B1 | R455A | PVE |
| R513 | B2 | R455A | PVE |
| R513 | B3 | R455A | PVE |
| R513 | B4 | R455A | PVE |
| R513 | B5 | R455A | PVE |
| R513 | B6 | R455A | PVE |
| R22 | R471A | R455A | PVE |
| R22 | R476A | R455A | PVE |
| R22 | B1 | R455A | PVE |
| R22 | B2 | R455A | PVE |
| R22 | B3 | R455A | PVE |
| R22 | B4 | R455A | PVE |
| R22 | B5 | R455A | PVE |
| R22 | B6 | R455A | PVE |
| R134a | R471A | R455A | PVE |
| R134a | R476A | R455A | PVE |
| R134a | B1 | R455A | PVE |
| R134a | B2 | R455A | PVE |
| R134a | B3 | R455A | PVE |
| R134a | B4 | R455A | PVE |
| R134a | B5 | R455A | PVE |
| R134a | B6 | R455A | PVE |
| R404A | R471A | R454C | PVE |
| R404A | R476A | R454C | PVE |
| R404A | B1 | R454C | PVE |
| R404A | B2 | R454C | PVE |
| R404A | B3 | R454C | PVE |
| R404A | B4 | R454C | PVE |
| R404A | B5 | R454C | PVE |
| R404A | B6 | R454C | PVE |
| R407 | R471A | R454C | PVE |
| R407 | R476A | R454C | PVE |
| R407 | B1 | R454C | PVE |
| R407 | B2 | R454C | PVE |
| R407 | B3 | R454C | PVE |
| R407 | B4 | R454C | PVE |
| R407 | B5 | R454C | PVE |
| R407 | B6 | R454C | PVE |
| R448 | R471A | R454C | PVE |
| R448 | R476A | R454C | PVE |
| R448 | B1 | R454C | PVE |
| R448 | B2 | R454C | PVE |
| R448 | B3 | R454C | PVE |
| R448 | B4 | R454C | PVE |
| R448 | B5 | R454C | PVE |
| R448 | B6 | R454C | PVE |
| R449 | R471A | R454C | PVE |
| R449 | R476A | R454C | PVE |
| R449 | B1 | R454C | PVE |
| R449 | B2 | R454C | PVE |
| R449 | B3 | R454C | PVE |
| R449 | B4 | R454C | PVE |
| R449 | B5 | R454C | PVE |
| R449 | B6 | R454C | PVE |
| R454 | R471A | R454C | PVE |
| R454 | R476A | R454C | PVE |
| R454 | B1 | R454C | PVE |
| R454 | B2 | R454C | PVE |
| R454 | B3 | R454C | PVE |
| R454 | B4 | R454C | PVE |
| R454 | B5 | R454C | PVE |
| R454 | B6 | R454C | PVE |
| R513 | R471A | R454C | PVE |
| R513 | R476A | R454C | PVE |
| R513 | B1 | R454C | PVE |
| R513 | B2 | R454C | PVE |
| R513 | B3 | R454C | PVE |
| R513 | B4 | R454C | PVE |
| R513 | B5 | R454C | PVE |
| R513 | B6 | R454C | PVE |
| R22 | R471A | R454C | PVE |
| R22 | R476A | R454C | PVE |
| R22 | B1 | R454C | PVE |
| R22 | B2 | R454C | PVE |
| R22 | B3 | R454C | PVE |
| R22 | B4 | R454C | PVE |
| R22 | B5 | R454C | PVE |
| R22 | B6 | R454C | PVE |
| R134a | R471A | R454C | PVE |
| R134a | R476A | R454C | PVE |
| R134a | B1 | R454C | PVE |
| R134a | B2 | R454C | PVE |
| R134a | B3 | R454C | PVE |
| R134a | B4 | R454C | PVE |
| R134a | B5 | R454C | PVE |
| R134a | B6 | R454C | PVE |
| R404A | R471A | R1234yf | PVE |
| R404A | R476A | R1234yf | PVE |
| R404A | B1 | R1234yf | PVE |
| R404A | B2 | R1234yf | PVE |
| R404A | B3 | R1234yf | PVE |
| R404A | B4 | R1234yf | PVE |
| R404A | B5 | R1234yf | PVE |
| R404A | B6 | R1234yf | PVE |
| R407 | R471A | R1234yf | PVE |
| R407 | R476A | R1234yf | PVE |
| R407 | B1 | R1234yf | PVE |
| R407 | B2 | R1234yf | PVE |
| R407 | B3 | R1234yf | PVE |
| R407 | B4 | R1234yf | PVE |
| R407 | B5 | R1234yf | PVE |
| R407 | B6 | R1234yf | PVE |
| R448 | R471A | R1234yf | PVE |
| R448 | R476A | R1234yf | PVE |
| R448 | B1 | R1234yf | PVE |
| R448 | B2 | R1234yf | PVE |
| R448 | B3 | R1234yf | PVE |
| R448 | B4 | R1234yf | PVE |
| R448 | B5 | R1234yf | PVE |
| R448 | B6 | R1234yf | PVE |
| R449 | R471A | R1234yf | PVE |
| R449 | R476A | R1234yf | PVE |
| R449 | B1 | R1234yf | PVE |
| R449 | B2 | R1234yf | PVE |
| R449 | B3 | R1234yf | PVE |
| R449 | B4 | R1234yf | PVE |
| R449 | B5 | R1234yf | PVE |
| R449 | B6 | R1234yf | PVE |
| R454 | R471A | R1234yf | PVE |
| R454 | R476A | R1234yf | PVE |
| R454 | B1 | R1234yf | PVE |
| R454 | B2 | R1234yf | PVE |
| R454 | B3 | R1234yf | PVE |
| R454 | B4 | R1234yf | PVE |
| R454 | B5 | R1234yf | PVE |
| R454 | B6 | R1234yf | PVE |
| R513 | R471A | R1234yf | PVE |
| R513 | R476A | R1234yf | PVE |
| R513 | B1 | R1234yf | PVE |
| R513 | B2 | R1234yf | PVE |

TABLE I-continued

| Existing Refrigerant | Replacement (Core) Refrigerant | Subcooling Refrigerant | Lubricant with Subcooling Refrigerant |
|---|---|---|---|
| R513 | B3 | R1234yf | PVE |
| R513 | B4 | R1234yf | PVE |
| R513 | B5 | R1234yf | PVE |
| R513 | B6 | R1234yf | PVE |
| R22 | R471A | R1234yf | PVE |
| R22 | R476A | R1234yf | PVE |
| R22 | B1 | R1234yf | PVE |
| R22 | B2 | R1234yf | PVE |
| R22 | B3 | R1234yf | PVE |
| R22 | B4 | R1234yf | PVE |
| R22 | B5 | R1234yf | PVE |
| R22 | B6 | R1234yf | PVE |
| R134a | R471A | R1234yf | PVE |
| R134a | R476A | R1234yf | PVE |
| R134a | B1 | R1234yf | PVE |
| R134a | B2 | R1234yf | PVE |
| R134a | B3 | R1234yf | PVE |
| R134a | B4 | R1234yf | PVE |
| R134a | B5 | R1234yf | PVE |
| R134a | B6 | R1234yf | PVE |
| R404A | R471A | R1234ze | PVE |
| R404A | R476A | R1234ze | PVE |
| R404A | B1 | R1234ze | PVE |
| R404A | B2 | R1234ze | PVE |
| R404A | B3 | R1234ze | PVE |
| R404A | B4 | R1234ze | PVE |
| R404A | B5 | R1234ze | PVE |
| R404A | B6 | R1234ze | PVE |
| R407 | R471A | R1234ze | PVE |
| R407 | R476A | R1234ze | PVE |
| R407 | B1 | R1234ze | PVE |
| R407 | B2 | R1234ze | PVE |
| R407 | B3 | R1234ze | PVE |
| R407 | B4 | R1234ze | PVE |
| R407 | B5 | R1234ze | PVE |
| R407 | B6 | R1234ze | PVE |
| R448 | R471A | R1234ze | PVE |
| R448 | R476A | R1234ze | PVE |
| R448 | B1 | R1234ze | PVE |
| R448 | B2 | R1234ze | PVE |
| R448 | B3 | R1234ze | PVE |
| R448 | B4 | R1234ze | PVE |
| R448 | B5 | R1234ze | PVE |
| R448 | B6 | R1234ze | PVE |
| R449 | R471A | R1234ze | PVE |
| R449 | R476A | R1234ze | PVE |
| R449 | B1 | R1234ze | PVE |
| R449 | B2 | R1234ze | PVE |
| R449 | B3 | R1234ze | PVE |
| R449 | B4 | R1234ze | PVE |
| R449 | B5 | R1234ze | PVE |
| R449 | B6 | R1234ze | PVE |
| R454 | R471A | R1234ze | PVE |
| R454 | R476A | R1234ze | PVE |
| R454 | B1 | R1234ze | PVE |
| R454 | B2 | R1234ze | PVE |
| R454 | B3 | R1234ze | PVE |
| R454 | B4 | R1234ze | PVE |
| R454 | B5 | R1234ze | PVE |
| R454 | B6 | R1234ze | PVE |
| R513 | R471A | R1234ze | PVE |
| R513 | R476A | R1234ze | PVE |
| R513 | B1 | R1234ze | PVE |
| R513 | B2 | R1234ze | PVE |
| R513 | B3 | R1234ze | PVE |
| R513 | B4 | R1234ze | PVE |
| R513 | B5 | R1234ze | PVE |
| R513 | B6 | R1234ze | PVE |
| R22 | R471A | R1234ze | PVE |
| R22 | R476A | R1234ze | PVE |
| R22 | B1 | R1234ze | PVE |
| R22 | B2 | R1234ze | PVE |
| R22 | B3 | R1234ze | PVE |
| R22 | B4 | R1234ze | PVE |
| R22 | B5 | R1234ze | PVE |
| R22 | B6 | R1234ze | PVE |
| R134a | R471A | R1234ze | PVE |
| R134a | R476A | R1234ze | PVE |
| R134a | B1 | R1234ze | PVE |
| R134a | B2 | R1234ze | PVE |
| R134a | B3 | R1234ze | PVE |
| R134a | B4 | R1234ze | PVE |
| R134a | B5 | R1234ze | PVE |
| R134a | B6 | R1234ze | PVE |
| R404A | R471A | R455A | PAG |
| R404A | R476A | R455A | PAG |
| R404A | B1 | R455A | PAG |
| R404A | B2 | R455A | PAG |
| R404A | B3 | R455A | PAG |
| R404A | B4 | R455A | PAG |
| R404A | B5 | R455A | PAG |
| R404A | B6 | R455A | PAG |
| R407 | R471A | R455A | PAG |
| R407 | R476A | R455A | PAG |
| R407 | B1 | R455A | PAG |
| R407 | B2 | R455A | PAG |
| R407 | B3 | R455A | PAG |
| R407 | B4 | R455A | PAG |
| R407 | B5 | R455A | PAG |
| R407 | B6 | R455A | PAG |
| R448 | R471A | R455A | PAG |
| R448 | R476A | R455A | PAG |
| R448 | B1 | R455A | PAG |
| R448 | B2 | R455A | PAG |
| R448 | B3 | R455A | PAG |
| R448 | B4 | R455A | PAG |
| R448 | B5 | R455A | PAG |
| R448 | B6 | R455A | PAG |
| R449 | R471A | R455A | PAG |
| R449 | R476A | R455A | PAG |
| R449 | B1 | R455A | PAG |
| R449 | B2 | R455A | PAG |
| R449 | B3 | R455A | PAG |
| R449 | B4 | R455A | PAG |
| R449 | B5 | R455A | PAG |
| R449 | B6 | R455A | PAG |
| R454 | R471A | R455A | PAG |
| R454 | R476A | R455A | PAG |
| R454 | B1 | R455A | PAG |
| R454 | B2 | R455A | PAG |
| R454 | B3 | R455A | PAG |
| R454 | B4 | R455A | PAG |
| R454 | B5 | R455A | PAG |
| R454 | B6 | R455A | PAG |
| R513 | R471A | R455A | PAG |
| R513 | R476A | R455A | PAG |
| R513 | B1 | R455A | PAG |
| R513 | B2 | R455A | PAG |
| R513 | B3 | R455A | PAG |
| R513 | B4 | R455A | PAG |
| R513 | B5 | R455A | PAG |
| R513 | B6 | R455A | PAG |
| R22 | R471A | R455A | PAG |
| R22 | R476A | R455A | PAG |
| R22 | B1 | R455A | PAG |
| R22 | B2 | R455A | PAG |
| R22 | B3 | R455A | PAG |
| R22 | B4 | R455A | PAG |
| R22 | B5 | R455A | PAG |
| R22 | B6 | R455A | PAG |
| R134a | R471A | R455A | PAG |
| R134a | R476A | R455A | PAG |
| R134a | B1 | R455A | PAG |
| R134a | B2 | R455A | PAG |
| R134a | B3 | R455A | PAG |
| R134a | B4 | R455A | PAG |
| R134a | B5 | R455A | PAG |
| R134a | B6 | R455A | PAG |
| R404A | R471A | R454C | PAG |
| R404A | R476A | R454C | PAG |
| R404A | B1 | R454C | PAG |
| R404A | B2 | R454C | PAG |

TABLE I-continued

| Existing Refrigerant | Replacement (Core) Refrigerant | Subcooling Refrigerant | Lubricant with Subcooling Refrigerant |
|---|---|---|---|
| R404A | B3 | R454C | PAG |
| R404A | B4 | R454C | PAG |
| R404A | B5 | R454C | PAG |
| R404A | B6 | R454C | PAG |
| R407 | R471A | R454C | PAG |
| R407 | R476A | R454C | PAG |
| R407 | B1 | R454C | PAG |
| R407 | B2 | R454C | PAG |
| R407 | B3 | R454C | PAG |
| R407 | B4 | R454C | PAG |
| R407 | B5 | R454C | PAG |
| R407 | B6 | R454C | PAG |
| R448 | R471A | R454C | PAG |
| R448 | R476A | R454C | PAG |
| R448 | B1 | R454C | PAG |
| R448 | B2 | R454C | PAG |
| R448 | B3 | R454C | PAG |
| R448 | B4 | R454C | PAG |
| R448 | B5 | R454C | PAG |
| R448 | B6 | R454C | PAG |
| R449 | R471A | R454C | PAG |
| R449 | R476A | R454C | PAG |
| R449 | B1 | R454C | PAG |
| R449 | B2 | R454C | PAG |
| R449 | B3 | R454C | PAG |
| R449 | B4 | R454C | PAG |
| R449 | B5 | R454C | PAG |
| R449 | B6 | R454C | PAG |
| R454 | R471A | R454C | PAG |
| R454 | R476A | R454C | PAG |
| R454 | B1 | R454C | PAG |
| R454 | B2 | R454C | PAG |
| R454 | B3 | R454C | PAG |
| R454 | B4 | R454C | PAG |
| R454 | B5 | R454C | PAG |
| R454 | B6 | R454C | PAG |
| R513 | R471A | R454C | PAG |
| R513 | R476A | R454C | PAG |
| R513 | B1 | R454C | PAG |
| R513 | B2 | R454C | PAG |
| R513 | B3 | R454C | PAG |
| R513 | B4 | R454C | PAG |
| R513 | B5 | R454C | PAG |
| R513 | B6 | R454C | PAG |
| R22 | R471A | R454C | PAG |
| R22 | R476A | R454C | PAG |
| R22 | B1 | R454C | PAG |
| R22 | B2 | R454C | PAG |
| R22 | B3 | R454C | PAG |
| R22 | B4 | R454C | PAG |
| R22 | B5 | R454C | PAG |
| R22 | B6 | R454C | PAG |
| R134a | R471A | R454C | PAG |
| R134a | R476A | R454C | PAG |
| R134a | B1 | R454C | PAG |
| R134a | B2 | R454C | PAG |
| R134a | B3 | R454C | PAG |
| R134a | B4 | R454C | PAG |
| R134a | B5 | R454C | PAG |
| R134a | B6 | R454C | PAG |
| R404A | R471A | R1234yf | PAG |
| R404A | R476A | R1234yf | PAG |
| R404A | B1 | R1234yf | PAG |
| R404A | B2 | R1234yf | PAG |
| R404A | B3 | R1234yf | PAG |
| R404A | B4 | R1234yf | PAG |
| R404A | B5 | R1234yf | PAG |
| R404A | B6 | R1234yf | PAG |
| R407 | R471A | R1234yf | PAG |
| R407 | R476A | R1234yf | PAG |
| R407 | B1 | R1234yf | PAG |
| R407 | B2 | R1234yf | PAG |
| R407 | B3 | R1234yf | PAG |
| R407 | B4 | R1234yf | PAG |
| R407 | B5 | R1234yf | PAG |
| R407 | B6 | R1234yf | PAG |
| R448 | R471A | R1234yf | PAG |
| R448 | R476A | R1234yf | PAG |
| R448 | B1 | R1234yf | PAG |
| R448 | B2 | R1234yf | PAG |
| R448 | B3 | R1234yf | PAG |
| R448 | B4 | R1234yf | PAG |
| R448 | B5 | R1234yf | PAG |
| R448 | B6 | R1234yf | PAG |
| R449 | R471A | R1234yf | PAG |
| R449 | R476A | R1234yf | PAG |
| R449 | B1 | R1234yf | PAG |
| R449 | B2 | R1234yf | PAG |
| R449 | B3 | R1234yf | PAG |
| R449 | B4 | R1234yf | PAG |
| R449 | B5 | R1234yf | PAG |
| R449 | B6 | R1234yf | PAG |
| R454 | R471A | R1234yf | PAG |
| R454 | R476A | R1234yf | PAG |
| R454 | B1 | R1234yf | PAG |
| R454 | B2 | R1234yf | PAG |
| R454 | B3 | R1234yf | PAG |
| R454 | B4 | R1234yf | PAG |
| R454 | B5 | R1234yf | PAG |
| R454 | B6 | R1234yf | PAG |
| R513 | R471A | R1234yf | PAG |
| R513 | R476A | R1234yf | PAG |
| R513 | B1 | R1234yf | PAG |
| R513 | B2 | R1234yf | PAG |
| R513 | B3 | R1234yf | PAG |
| R513 | B4 | R1234yf | PAG |
| R513 | B5 | R1234yf | PAG |
| R513 | B6 | R1234yf | PAG |
| R22 | R471A | R1234yf | PAG |
| R22 | R476A | R1234yf | PAG |
| R22 | B1 | R1234yf | PAG |
| R22 | B2 | R1234yf | PAG |
| R22 | B3 | R1234yf | PAG |
| R22 | B4 | R1234yf | PAG |
| R22 | B5 | R1234yf | PAG |
| R22 | B6 | R1234yf | PAG |
| R134a | R471A | R1234yf | PAG |
| R134a | R476A | R1234yf | PAG |
| R134a | B1 | R1234yf | PAG |
| R134a | B2 | R1234yf | PAG |
| R134a | B3 | R1234yf | PAG |
| R134a | B4 | R1234yf | PAG |
| R134a | B5 | R1234yf | PAG |
| R134a | B6 | R1234yf | PAG |
| R404A | R471A | R1234ze | PAG |
| R404A | R476A | R1234ze | PAG |
| R404A | B1 | R1234ze | PAG |
| R404A | B2 | R1234ze | PAG |
| R404A | B3 | R1234ze | PAG |
| R404A | B4 | R1234ze | PAG |
| R404A | B5 | R1234ze | PAG |
| R404A | B6 | R1234ze | PAG |
| R407 | R471A | R1234ze | PAG |
| R407 | R476A | R1234ze | PAG |
| R407 | B1 | R1234ze | PAG |
| R407 | B2 | R1234ze | PAG |
| R407 | B3 | R1234ze | PAG |
| R407 | B4 | R1234ze | PAG |
| R407 | B5 | R1234ze | PAG |
| R407 | B6 | R1234ze | PAG |
| R448 | R471A | R1234ze | PAG |
| R448 | R476A | R1234ze | PAG |
| R448 | B1 | R1234ze | PAG |
| R448 | B2 | R1234ze | PAG |
| R448 | B3 | R1234ze | PAG |
| R448 | B4 | R1234ze | PAG |
| R448 | B5 | R1234ze | PAG |
| R448 | B6 | R1234ze | PAG |
| R449 | R471A | R1234ze | PAG |
| R449 | R476A | R1234ze | PAG |
| R449 | B1 | R1234ze | PAG |
| R449 | B2 | R1234ze | PAG |

TABLE I-continued

| Existing Refrigerant | Replacement (Core) Refrigerant | Subcooling Refrigerant | Lubricant with Subcooling Refrigerant |
| --- | --- | --- | --- |
| R449 | B3 | R1234ze | PAG |
| R449 | B4 | R1234ze | PAG |
| R449 | B5 | R1234ze | PAG |
| R449 | B6 | R1234ze | PAG |
| R454 | R471A | R1234ze | PAG |
| R454 | R476A | R1234ze | PAG |
| R454 | B1 | R1234ze | PAG |
| R454 | B2 | R1234ze | PAG |
| R454 | B3 | R1234ze | PAG |
| R454 | B4 | R1234ze | PAG |
| R454 | B5 | R1234ze | PAG |
| R454 | B6 | R1234ze | PAG |
| R513 | R471A | R1234ze | PAG |
| R513 | R476A | R1234ze | PAG |
| R513 | B1 | R1234ze | PAG |
| R513 | B2 | R1234ze | PAG |
| R513 | B3 | R1234ze | PAG |
| R513 | B4 | R1234ze | PAG |
| R513 | B5 | R1234ze | PAG |
| R513 | B6 | R1234ze | PAG |
| R22 | R471A | R1234ze | PAG |
| R22 | R476A | R1234ze | PAG |
| R22 | B1 | R1234ze | PAG |
| R22 | B2 | R1234ze | PAG |
| R22 | B3 | R1234ze | PAG |
| R22 | B4 | R1234ze | PAG |
| R22 | B5 | R1234ze | PAG |
| R22 | B6 | R1234ze | PAG |
| R134a | R471A | R1234ze | PAG |
| R134a | R476A | R1234ze | PAG |
| R134a | B1 | R1234ze | PAG |
| R134a | B2 | R1234ze | PAG |
| R134a | B3 | R1234ze | PAG |
| R134a | B4 | R1234ze | PAG |
| R134a | B5 | R1234ze | PAG |
| R134a | B6 | R1234ze | PAG |
| R404A | R471A | R455A | POE |
| R404A | R476A | R455A | POE |
| R404A | B1 | R455A | POE |
| R404A | B2 | R455A | POE |
| R404A | B3 | R455A | POE |
| R404A | B4 | R455A | POE |
| R404A | B5 | R455A | POE |
| R404A | B6 | R455A | POE |
| R407 | R471A | R455A | POE |
| R407 | R476A | R455A | POE |
| R407 | B1 | R455A | POE |
| R407 | B2 | R455A | POE |
| R407 | B3 | R455A | POE |
| R407 | B4 | R455A | POE |
| R407 | B5 | R455A | POE |
| R407 | B6 | R455A | POE |
| R448 | R471A | R455A | POE |
| R448 | R476A | R455A | POE |
| R448 | B1 | R455A | POE |
| R448 | B2 | R455A | POE |
| R448 | B3 | R455A | POE |
| R448 | B4 | R455A | POE |
| R448 | B5 | R455A | POE |
| R448 | B6 | R455A | POE |
| R449 | R471A | R455A | POE |
| R449 | R476A | R455A | POE |
| R449 | B1 | R455A | POE |
| R449 | B2 | R455A | POE |
| R449 | B3 | R455A | POE |
| R449 | B4 | R455A | POE |
| R449 | B5 | R455A | POE |
| R449 | B6 | R455A | POE |
| R454 | R471A | R455A | POE |
| R454 | R476A | R455A | POE |
| R454 | B1 | R455A | POE |
| R454 | B2 | R455A | POE |
| R454 | B3 | R455A | POE |
| R454 | B4 | R455A | POE |
| R454 | B5 | R455A | POE |
| R454 | B6 | R455A | POE |
| R513 | R471A | R455A | POE |
| R513 | R476A | R455A | POE |
| R513 | B1 | R455A | POE |
| R513 | B2 | R455A | POE |
| R513 | B3 | R455A | POE |
| R513 | B4 | R455A | POE |
| R513 | B5 | R455A | POE |
| R513 | B6 | R455A | POE |
| R22 | R471A | R455A | POE |
| R22 | R476A | R455A | POE |
| R22 | B1 | R455A | POE |
| R22 | B2 | R455A | POE |
| R22 | B3 | R455A | POE |
| R22 | B4 | R455A | POE |
| R22 | B5 | R455A | POE |
| R22 | B6 | R455A | POE |
| R134a | R471A | R455A | POE |
| R134a | R476A | R455A | POE |
| R134a | B1 | R455A | POE |
| R134a | B2 | R455A | POE |
| R134a | B3 | R455A | POE |
| R134a | B4 | R455A | POE |
| R134a | B5 | R455A | POE |
| R134a | B6 | R455A | POE |
| R404A | R471A | R454C | POE |
| R404A | R476A | R454C | POE |
| R404A | B1 | R454C | POE |
| R404A | B2 | R454C | POE |
| R404A | B3 | R454C | POE |
| R404A | B4 | R454C | POE |
| R404A | B5 | R454C | POE |
| R404A | B6 | R454C | POE |
| R407 | R471A | R454C | POE |
| R407 | R476A | R454C | POE |
| R407 | B1 | R454C | POE |
| R407 | B2 | R454C | POE |
| R407 | B3 | R454C | POE |
| R407 | B4 | R454C | POE |
| R407 | B5 | R454C | POE |
| R407 | B6 | R454C | POE |
| R448 | R471A | R454C | POE |
| R448 | R476A | R454C | POE |
| R448 | B1 | R454C | POE |
| R448 | B2 | R454C | POE |
| R448 | B3 | R454C | POE |
| R448 | B4 | R454C | POE |
| R448 | B5 | R454C | POE |
| R448 | B6 | R454C | POE |
| R449 | R471A | R454C | POE |
| R449 | R476A | R454C | POE |
| R449 | B1 | R454C | POE |
| R449 | B2 | R454C | POE |
| R449 | B3 | R454C | POE |
| R449 | B4 | R454C | POE |
| R449 | B5 | R454C | POE |
| R449 | B6 | R454C | POE |
| R454 | R471A | R454C | POE |
| R454 | R476A | R454C | POE |
| R454 | B1 | R454C | POE |
| R454 | B2 | R454C | POE |
| R454 | B3 | R454C | POE |
| R454 | B4 | R454C | POE |
| R454 | B5 | R454C | POE |
| R454 | B6 | R454C | POE |
| R513 | R471A | R454C | POE |
| R513 | R476A | R454C | POE |
| R513 | B1 | R454C | POE |
| R513 | B2 | R454C | POE |
| R513 | B3 | R454C | POE |
| R513 | B4 | R454C | POE |
| R513 | B5 | R454C | POE |
| R513 | B6 | R454C | POE |
| R22 | R471A | R454C | POE |
| R22 | R476A | R454C | POE |
| R22 | B1 | R454C | POE |
| R22 | B2 | R454C | POE |

TABLE I-continued

| Existing Refrigerant | Replacement (Core) Refrigerant | Subcooling Refrigerant | Lubricant with Subcooling Refrigerant |
|---|---|---|---|
| R22 | B3 | R454C | POE |
| R22 | B4 | R454C | POE |
| R22 | B5 | R454C | POE |
| R22 | B6 | R454C | POE |
| R134a | R471A | R454C | POE |
| R134a | R476A | R454C | POE |
| R134a | B1 | R454C | POE |
| R134a | B2 | R454C | POE |
| R134a | B3 | R454C | POE |
| R134a | B4 | R454C | POE |
| R134a | B5 | R454C | POE |
| R134a | B6 | R454C | POE |
| R404A | R471A | R1234yf | POE |
| R404A | R476A | R1234yf | POE |
| R404A | B1 | R1234yf | POE |
| R404A | B2 | R1234yf | POE |
| R404A | B3 | R1234yf | POE |
| R404A | B4 | R1234yf | POE |
| R404A | B5 | R1234yf | POE |
| R404A | B6 | R1234yf | POE |
| R407 | R471A | R1234yf | POE |
| R407 | R476A | R1234yf | POE |
| R407 | B1 | R1234yf | POE |
| R407 | B2 | R1234yf | POE |
| R407 | B3 | R1234yf | POE |
| R407 | B4 | R1234yf | POE |
| R407 | B5 | R1234yf | POE |
| R407 | B6 | R1234yf | POE |
| R448 | R471A | R1234yf | POE |
| R448 | R476A | R1234yf | POE |
| R448 | B1 | R1234yf | POE |
| R448 | B2 | R1234yf | POE |
| R448 | B3 | R1234yf | POE |
| R448 | B4 | R1234yf | POE |
| R448 | B5 | R1234yf | POE |
| R448 | B6 | R1234yf | POE |
| R449 | R471A | R1234yf | POE |
| R449 | R476A | R1234yf | POE |
| R449 | B1 | R1234yf | POE |
| R449 | B2 | R1234yf | POE |
| R449 | B3 | R1234yf | POE |
| R449 | B4 | R1234yf | POE |
| R449 | B5 | R1234yf | POE |
| R449 | B6 | R1234yf | POE |
| R454 | R471A | R1234yf | POE |
| R454 | R476A | R1234yf | POE |
| R454 | B1 | R1234yf | POE |
| R454 | B2 | R1234yf | POE |
| R454 | B3 | R1234yf | POE |
| R454 | B4 | R1234yf | POE |
| R454 | B5 | R1234yf | POE |
| R454 | B6 | R1234yf | POE |
| R513 | R471A | R1234yf | POE |
| R513 | R476A | R1234yf | POE |
| R513 | B1 | R1234yf | POE |
| R513 | B2 | R1234yf | POE |
| R513 | B3 | R1234yf | POE |
| R513 | B4 | R1234yf | POE |
| R513 | B5 | R1234yf | POE |
| R513 | B6 | R1234yf | POE |
| R22 | R471A | R1234yf | POE |
| R22 | R476A | R1234yf | POE |
| R22 | B1 | R1234yf | POE |
| R22 | B2 | R1234yf | POE |
| R22 | B3 | R1234yf | POE |
| R22 | B4 | R1234yf | POE |
| R22 | B5 | R1234yf | POE |
| R22 | B6 | R1234yf | POE |
| R134a | R471A | R1234yf | POE |
| R134a | R476A | R1234yf | POE |
| R134a | B1 | R1234yf | POE |
| R134a | B2 | R1234yf | POE |
| R134a | B3 | R1234yf | POE |
| R134a | B4 | R1234yf | POE |
| R134a | B5 | R1234yf | POE |
| R134a | B6 | R1234yf | POE |
| R404A | R471A | R1234ze | POE |
| R404A | R476A | R1234ze | POE |
| R404A | B1 | R1234ze | POE |
| R404A | B2 | R1234ze | POE |
| R404A | B3 | R1234ze | POE |
| R404A | B4 | R1234ze | POE |
| R404A | B5 | R1234ze | POE |
| R404A | B6 | R1234ze | POE |
| R407 | R471A | R1234ze | POE |
| R407 | R476A | R1234ze | POE |
| R407 | B1 | R1234ze | POE |
| R407 | B2 | R1234ze | POE |
| R407 | B3 | R1234ze | POE |
| R407 | B4 | R1234ze | POE |
| R407 | B5 | R1234ze | POE |
| R407 | B6 | R1234ze | POE |
| R448 | R471A | R1234ze | POE |
| R448 | R476A | R1234ze | POE |
| R448 | B1 | R1234ze | POE |
| R448 | B2 | R1234ze | POE |
| R448 | B3 | R1234ze | POE |
| R448 | B4 | R1234ze | POE |
| R448 | B5 | R1234ze | POE |
| R448 | B6 | R1234ze | POE |
| R449 | R471A | R1234ze | POE |
| R449 | R476A | R1234ze | POE |
| R449 | B1 | R1234ze | POE |
| R449 | B2 | R1234ze | POE |
| R449 | B3 | R1234ze | POE |
| R449 | B4 | R1234ze | POE |
| R449 | B5 | R1234ze | POE |
| R449 | B6 | R1234ze | POE |
| R454 | R471A | R1234ze | POE |
| R454 | R476A | R1234ze | POE |
| R454 | B1 | R1234ze | POE |
| R454 | B2 | R1234ze | POE |
| R454 | B3 | R1234ze | POE |
| R454 | B4 | R1234ze | POE |
| R454 | B5 | R1234ze | POE |
| R454 | B6 | R1234ze | POE |
| R513 | R471A | R1234ze | POE |
| R513 | R476A | R1234ze | POE |
| R513 | B1 | R1234ze | POE |
| R513 | B2 | R1234ze | POE |
| R513 | B3 | R1234ze | POE |
| R513 | B4 | R1234ze | POE |
| R513 | B5 | R1234ze | POE |
| R513 | B6 | R1234ze | POE |
| R22 | R471A | R1234ze | POE |
| R22 | R476A | R1234ze | POE |
| R22 | B1 | R1234ze | POE |
| R22 | B2 | R1234ze | POE |
| R22 | B3 | R1234ze | POE |
| R22 | B4 | R1234ze | POE |
| R22 | B5 | R1234ze | POE |
| R22 | B6 | R1234ze | POE |
| R134a | R471A | R1234ze | POE |
| R134a | R476A | R1234ze | POE |
| R134a | B1 | R1234ze | POE |
| R134a | B2 | R1234ze | POE |
| R134a | B3 | R1234ze | POE |
| R134a | B4 | R1234ze | POE |
| R134a | B5 | R1234ze | POE |
| R134a | B6 | R1234ze | POE |

EXAMPLES

The following examples are provided for the purpose of illustrating the present invention but without limiting the scope thereof.

When evaluating methods to improve a refrigeration system, including replacing a higher GWP refrigerant with a lower GWP refrigerant, it is important to consider performance parameters such as: (1) the volumetric flow rate of the refrigerant in the system to achieve the same cooling capacity; (2) the mass flow rate of the refrigerant in the system to achieve the same cooling capacity; (3) the density of the refrigerant; and (4) the pressure loss ratio.

Comparative Example 1—Refrigeration System Using R-404A as Refrigerant

A refrigeration system of the type disclosed in FIG. 1 was provided with R-404A as the existing refrigerant. The system operating conditions using R-404A as the refrigerant were:
Cooling capacity: 45.0 kW
Isentropic efficiency: 0.65
Volumetric efficiency: 100%
Condensing temperature: 40° C.
Superheat: 10° C.
Evaporating temperature: −10° C.

While this system operates well from the standpoint of thermodynamic and heat transfer performance, it is highly undesirable from the standpoint of its environmental impact since the entire system contains the high GWP refrigerant R404A circulating throughout. The performance of this system is further summarized in Results Tables 1 and 2 below.

Comparative Example 2—Refrigeration System Using R-471A Instead of R-404A

Comparative Example 1 was repeated, except that low GWP refrigerant R-471A is used instead of R-404A. R-471A is a refrigerant consisting of the following components in the following relative amounts:

| | Wt. % |
|---|---|
| R 471A Component | |
| 1234ze(E) | 78.7 |
| 1336mzz(E) | 17 |
| R227ea | 4.3 |
| Property | |
| GWP (per IPCC AR5) | 148 |

The performance of this system is further summarized in Results Tables 1 and 2 below.

Results Table 1

| | Comp. Ex. 1 | Comp. Ex. 2 |
|---|---|---|
| Refrigerant | R404A | R471A |
| Displacement (m3/h) | 100 | 100 |
| Evaporation Temperature (° C.) | −10 | −10 |

Results Table 1

| | Comp. Ex. 1 | Comp. Ex. 2 |
|---|---|---|
| Condensing Temperature (° C.) | 40 | 40 |
| Cooling Capacity (kW) | 45.0 | 17.6 |
| Compressor Efficiency | 65% | 65% |
| Cooling Capacity wrt R404A (%) | 100% | 39% |
| Power Consumption (kW) | 20.5 | 7.1 |
| Mass Flow Rate (kg/hr) | 1535 | 518 |
| COP | 2.20 | 2.48 |
| COP vs R404A % | 100% | 113% |

As can be seen from the results in Results Table 1 above, exchanging R-417A for R-404A improves the system from the standpoint of containing a low GWP refrigerant, but lowers cooling capacity. The present invention solves this and other problems.

Example 1—Improving Refrigeration System by Installing Dedicated Mechanical Subcooling System (DMSS) Using R455A and Replacing R404A with Refrigerant A1 (R-471A)

The heat transfer system of Comparative Example 1, including the existing refrigerant R404A contained therein, was used as the starting point for the formation of an improved heat transfer system illustrated by FIG. 3. The refrigeration system was emptied of refrigerant R404A and a sub-cooling heat exchanger (6) was installed between the receiver (2) and expansion valve (3). The sub-cooling heat exchanger was configured to exchange heat between the main refrigeration circuit and a Dedicated Mechanical Subcooling System (DMSS) (102), which served to cool the refrigerant flowing through the existing refrigerant circuit. The DMSS evaporating temperature was 0° C. and the condensing temperature was 40° C. Other details of the DMSS are provided in Results Table 2 below.

Once modified, refrigerant R471A was used as the core circuit refrigerant and refrigerant R455A was used as the DMSS refrigeration. Performance of the improved refrigeration system is summarized in Results Table 2 below.

Example 2—Improving Refrigeration System by Installing Dedicated Mechanical Subcooling System (DMSS) Using R455A, Replacing R404A with Refrigerant A1 (R-471A) and Modifying Heat Exchanger Example 1 was repeated except that the heat exchanger was modified to accommodate a low pressure fluid. Performance of the improved refrigeration system is summarized in Results Table 2 below.

Results Table 2

| | Comp. Ex. 1 | Comp. Ex. 2 | Example 1 | Example 2 |
|---|---|---|---|---|
| Main Circuit Refrigerant | R404A | R471A | R471A | R471A |
| DMSS Refrigerant | n/a | n/a | R455A | R455A |
| displacement of the core refrigerant circuit (m3/h) | 100 | 100 | 100 | 100 |
| Evaporation Temperature of the core refrigerant circuit (° C.) | −10 | −10 | −10 | −5 |

-continued

Results Table 2

|  | Comp. Ex. 1 | Comp. Ex. 2 | Example 1 | Example 2 |
| --- | --- | --- | --- | --- |
| Condensing Temperature of the core refrigerant circuit (° C.) | 40 | 40 | 40 | 40 |
| Cooling Capacity of the core refrigerant circuit (kW) | 45.0 | 17.6 | 25.6 | 31.6 |
| Compressor Efficiency of the core refrigerant circuit | 65% | 65% | 65% | 65% |
| Cooling Capacity of the core refrigerant circuit as a percentage of R404A in Comparative Example 1 (%) | 100% | 39% | 57% | 70% |
| Power Consumption of DMSS (kW) | NA | NA | 2.44 | 2.96 |
| Power Consumption of total system (kW) | 20.5 | 7.1 | 9.6 | 10.6 |
| Mass Flow Rate of the core refrigerant circuit (kg/hr) | 1535 | 518 | 523 | 634 |
| COP of total heat transfer system | 2.20 | 2.48 | 2.67 | 2.99 |
| Subcooling of core refrigerant by subcooling heat exchanger (° C.) | 0 | 0 | 40 | 40 |
| COP of total heat transfer system as a percentage of R404A in Comparative Example 1 (%) | 100% | 113% | 122% | 136% |

As can be seen from Results Table 2, replacing high GWP refrigerant R404A with a lower GWP refrigerant such as R471A led to an unacceptable drop in cooling capacity. However, this disadvantage can be surprisingly mitigated by installing a deep subcooling system between the condenser and the evaporator. Cooling capacity increases from 39% of R404A to 57% of R404A without making other alterations. Modifying the heat exchanger increases this further, to 70% of R404A.

Multiple advantages are associated with these modifications to the system of Comparative Example 1. First, the GWP of the refrigerant circulating around the main circuit can be lowered significantly without sacrificing an intolerable level of cooling capacity. Second, the modifications to the main refrigeration circuit itself are relatively modest, requiring purely the installation of a heat exchanger between the condenser and evaporators.

Example 3—Improving Refrigeration System by Installing Dedicated Mechanical Subcooling System (DMSS) Using R454C and Replacing R404A with Refrigerant A1 (R-471A)

Example 1 was repeated, but with refrigerant R454C used in the DMSS circuit. Performance of the improved refrigeration system is summarized in Results Table 3 below.

Example 4—Improving Refrigeration System by Installing Dedicated Mechanical Subcooling System (DMSS) Using R454C, Replacing R404A with Refrigerant A1 (R-471A) and Modifying Heat Exchanger Example 2 is repeated, but with refrigerant R454C used in the DMSS circuit. Performance of the improved refrigeration system is summarized in Results Table 3 below.

Results Table 3

|  | Comp. Ex. 1 | Comp. Ex. 2 | Example 3 | Example 4 |
| --- | --- | --- | --- | --- |
| Main Circuit Refrigerant | R404A | R471A | R471A | R471A |
| DMSS Refrigerant | n/a | n/a | R454C | R454C |
| displacement of the core refrigerant circuit (m3/h) | 100 | 100 | 100 | 100 |
| Evaporation Temperature of the core refrigerant circuit (° C.) | −10 | −10 | −10 | −5 |
| Condensing Temperature of the core refrigerant circuit (° C.) | 40 | 40 | 40 | 40 |
| Cooling Capacity of the core refrigerant circuit (kW) | 45 | 17.6 | 25.6 | 31.6 |
| Compressor Efficiency of the core refrigerant circuit | 0.65 | 0.65 | 55 | 65 |
| Cooling Capacity of the core refrigerant circuit as a percentage of R404A in Comparative Example 1 (%) | 100% | 39% | 57% | 70% |
| Power Consumption of DMSS (kW) | NA | NA | 2.42 | 2.93 |
| Power Consumption of total system (kW) | 20.5 | 7.1 | 9.5 | 10.6 |
| Mass Flow Rate of the core refrigerant circuit (kg/hr) | 1535 | 518 | 523 | 634 |
| COP of total heat transfer system | 2.20 | 2.48 | 2.68 | 2.99 |
| Subcooling of core refrigerant by subcooling heat exchanger (° C.) | 0 | 0 | 40 | 40 |

-continued

Results Table 3

|  | Comp. Ex. 1 | Comp. Ex. 2 | Example 3 | Example 4 |
| --- | --- | --- | --- | --- |
| COP of total heat transfer system as a percentage of R404A in Comparative Example 1 (%) | 100% | 113% | 122% | 136% |

As with Examples 1 and 2, Examples 3 and 4 show that good cooling capacity can be achieved using the present invention. Examples 3 and 4 further show that various refrigerants can be used in the DMSS circuit.

Example 5—Improving Refrigeration System by Installing Dedicated Mechanical Subcooling System (DMSS) Using Propane and Replacing R404A with Refrigerant A1 (R-471A)

Example 1 is repeated, but with refrigerant propane used in the DMSS circuit. Performance of the improved refrigeration system is summarized in Results Table 4 below.

Example 6—Improving Refrigeration System by Installing Dedicated Mechanical Subcooling System (DMSS) Using Propane, Replacing R404A with Refrigerant A1 (R-471A) and Modifying Heat Exchanger Example 2 was repeated, but with refrigerant propane used in the DMSS circuit. Performance of the improved refrigeration system is summarized in Results Table 4 below.

Results Table 4

|  | Comp. Ex. 1 | Comp. Ex. 2 | Example 5 | Example 6 |
| --- | --- | --- | --- | --- |
| Main Circuit Refrigerant | R404A | R471A | R471A | R471A |
| DMSS Refrigerant | n/a | n/a | propane | propane |
| displacement of the core refrigerant circuit (m3/h) | 100 | 100 | 100 | 100 |
| Evaporation Temperature of the core refrigerant circuit (° C.) | −10 | −10 | −10 | −5 |
| Condensing Temperature of the core refrigerant circuit (° C.) | 40 | 40 | 40 | 40 |
| Cooling Capacity of the core refrigerant circuit (kW) | 45 | 17.6 | 25.6 | 31.6 |
| Compressor Efficiency of the core refrigerant circuit | 0.65 | 0.65 | 55 | 65 |
| Cooling Capacity of the core refrigerant circuit as a percentage of R404A in Comparative Example 1 (%) | 100% | 39% | 57% | 70% |
| Power Consumption of DMSS (kW) | NA | NA | 2.33 | 2.82 |
| Power Consumption of total system (kW) | 20.5 | 7.1 | 9.5 | 10.4 |
| Mass Flow Rate of the core refrigerant circuit (kg/hr) | 1535 | 518 | 523 | 634 |
| COP of total heat transfer system | 2.20 | 2.48 | 2.70 | 3.03 |
| Subcooling of core refrigerant by subcooling heat exchanger (° C.) | 0 | 0 | 40 | 40 |
| COP of total heat transfer system as a percentage of R404A in Comparative Example 1 (%) | 100% | 113% | 123% | 138% |

Examples 5 and 6 show that good cooling capacity can be achieved using the present invention, and further emphasizes the flexibility of subcooling refrigerant.

Example 7—Improving Refrigeration System by Installing Dedicated Mechanical Subcooling System (DMSS) Using HFO-1234yf and Replacing R404A with Refrigerant A1 (R-471A)

Example 1 was repeated, but with refrigerant HFO-1234yf used in the DMSS circuit. Performance of the improved refrigeration system is summarized in Results Table 4 below.

Example 8—Improving Refrigeration System by Installing Dedicated Mechanical Subcooling System (DMSS) Using HFO-1234yf, Replacing R404A with Refrigerant A1 (R-471A) and Modifying Heat Exchanger Example 2 was repeated, but with refrigerant HFO-1234yf used in the DMSS circuit. Performance of the improved refrigeration system is summarized in Results Table 4 below.

Results Table 4

|  | Comp. Ex. 1 | Comp. Ex. 2 | Example 7 | Example 8 |
|---|---|---|---|---|
| Main Circuit Refrigerant | R404A | R471A | R471A | R471A |
| DMSS Refrigerant | n/a | n/a | HFO-1234yf | HFO-1234yf |
| displacement of the core refrigerant circuit (m3/h) | 100 | 100 | 100 | 100 |
| Evaporation Temperature of the core refrigerant circuit (° C.) | −10 | −10 | −10 | −5 |
| Condensing Temperature of the core refrigerant circuit (° C.) | 40 | 40 | 40 | 40 |
| Cooling Capacity of the core refrigerant circuit (kW) | 45 | 17.6 | 25.6 | 31.6 |
| Compressor Efficiency of the core refrigerant circuit | 0.65 | 0.65 | 55 | 65 |
| Cooling Capacity of the core refrigerant circuit as a percentage of R404A in Comparative Example 1 (%) | 100% | 39% | 57% | 70% |
| Power Consumption of DMSS (kW) | NA | NA | 2.40 | 2.91 |
| Power Consumption of total system (kW) | 20.5 | 7.1 | 9.5 | 10.5 |
| Mass Flow Rate of the core refrigerant circuit (kg/hr) | 1535 | 518 | 523 | 634 |
| COP of total heat transfer system | 2.20 | 2.48 | 2.68 | 3.00 |
| Subcooling of core refrigerant by subcooling heat exchanger (° C.) | 0 | 0 | 40 | 40 |
| COP of total heat transfer system as a percentage of R404A in Comparative Example 1 (%) | 100% | 113% | 122% | 136% |

Examples 7 and 8 show that good cooling capacity can be achieved using the present invention, and further emphasizes the flexibility of subcooling refrigerant.

Example 9—Improving Refrigeration System by Installing Dedicated Mechanical Subcooling System (DMSS) Using R152a and Replacing R404A with Refrigerant A1 (R-471A)

Example 1 was repeated, but with refrigerant R152a used in the DMSS circuit. Performance of the improved refrigeration system is summarized in Results Table 5 below.

Example 10—Improving Refrigeration System by Installing Dedicated Mechanical Subcooling System (DMSS) Using R152a, Replacing R404A with Refrigerant A1 (R-471A) and Modifying Heat Exchanger Example 2 was repeated, but with refrigerant R152a used in the DMSS circuit. Performance of the improved refrigeration system is summarized in Results Table 5 below.

Results Table 5

|  | Comp. Ex. 1 | Comp. Ex. 2 | Ex. 9 | Ex. 10 |
|---|---|---|---|---|
| Main Circuit Refrigerant | R404A | R471A | R471A | R471A |
| DMSS Refrigerant | n/a | n/a | R152a | R152a |
| displacement of the core refrigerant circuit (m3/h) | 100 | 100 | 100 | 100 |
| Evaporation Temperature of the core refrigerant circuit (° C.) | −10 | −10 | −10 | −5 |
| Condensing Temperature of the core refrigerant circuit (° C.) | 40 | 40 | 40 | 40 |
| Cooling Capacity of the core refrigerant circuit (kW) | 45 | 17.6 | 25.6 | 31.6 |
| Compressor Efficiency of the core refrigerant circuit | 0.65 | 0.65 | 55 | 65 |

| Results Table 5 | | | | |
|---|---|---|---|---|
| | Comp. Ex. 1 | Comp. Ex. 2 | Ex. 9 | Ex. 10 |
| Cooling Capacity of the core refrigerant circuit as a percentage of R404A in Comparative Example 1 (%) | 100% | 39% | 57% | 70% |
| Power Consumption of DMSS (kW) | NA | NA | 2.19 | 2.66 |
| Power Consumption of total system (kW) | 20.5 | 7.1 | 9.3 | 10.3 |
| Mass Flow Rate of the core refrigerant circuit (kg/hr) | 1535 | 518 | 523 | 634 |
| COP of total heat transfer system | 2.20 | 2.48 | 2.74 | 3.07 |
| Subcooling of core refrigerant by subcooling heat exchanger (° C.) | 0 | 0 | 40 | 40 |
| COP of total heat transfer system as a percentage of R404A in Comparative Example 1 (%) | 100% | 113% | 125% | 140% |

Examples 9 and 10 show that good cooling capacity can be achieved using the present invention, and further emphasizes the flexibility of subcooling refrigerant.

Example 11—Improving Refrigeration System by Installing Dedicated Mechanical Subcooling System (DMSS) Using HFO-1234(E) and Replacing R404A with Refrigerant A1 (R-471A)

Example 1 was repeated, but with refrigerant HFO-1234(E) used in the DMSS circuit. Performance of the improved refrigeration system is summarized in Results Table 6 below.

Example 12—Improving Refrigeration System by Installing Dedicated Mechanical Subcooling System (DMSS) Using HFO-1234(E), Replacing R404A with Refrigerant A1 (R-471A) and Modifying Heat Exchanger Example 2 was repeated, but with refrigerant HFO-1234(E) used in the DMSS circuit. Performance of the improved refrigeration system is summarized in Results Table 6 below.

| Results Table 6 | | | | |
|---|---|---|---|---|
| | Comp. Ex. 1 | Comp. Ex. 2 | Ex. 11 | Ex. 12 |
| Main Circuit Refrigerant | R404A | R471A | R471A | R471A |
| DMSS Refrigerant | n/a | n/a | HFO-1234(E) | HFO-1234(E) |
| displacement of the core refrigerant circuit (m3/h) | 100 | 100 | 100 | 100 |
| Evaporation Temperature of the core refrigerant circuit (° C.) | −10 | −10 | −10 | −5 |
| Condensing Temperature of the core refrigerant circuit (° C.) | 40 | 40 | 40 | 40 |
| Cooling Capacity of the core refrigerant circuit (kW) | 45 | 17.6 | 25.6 | 31.6 |
| Compressor Efficiency of the core refrigerant circuit | 0.65 | 0.65 | 55 | 65 |
| Cooling Capacity of the core refrigerant circuit as a percentage of R404A in Comparative Example 1 (%) | 100% | 39% | 57% | 70% |
| Power Consumption of DMSS (kW) | NA | NA | 2.28 | 2.77 |
| Power Consumption of total system (kW) | 20.5 | 7.1 | 9.4 | 10.4 |
| Mass Flow Rate of the core refrigerant circuit (kg/hr) | 1535 | 518 | 523 | 634 |
| COP of total heat transfer system | 2.20 | 2.48 | 2.72 | 3.04 |
| Subcooling of core refrigerant by subcooling heat exchanger (° C.) | 0 | 0 | 40 | 40 |
| COP of total heat transfer system as a percentage of R404A in Comparative Example 1 (%) | 100% | 113% | 124% | 138% |

Examples 11 and 12 show that good cooling capacity can be achieved using the present invention, and further emphasizes the flexibility of subcooling refrigerant.

Example 13—Improving Refrigeration System by Installing Dedicated Mechanical Subcooling System (DMSS) Using R471A and Replacing R404A with Refrigerant A1 (R-471A)

Example 1 was repeated, but with refrigerant R471A used in the DMSS circuit. Performance of the improved refrigeration system is summarized in Results Table 7 below.

Example 14—Improving Refrigeration System by Installing Dedicated Mechanical Subcooling System (DMSS) Using R471A, Replacing R404A with Refrigerant A1 (R-471A) and Modifying Heat Exchanger Example 2 was repeated, but with refrigerant R471A used in the DMSS circuit. Performance of the improved refrigeration system is summarized in Results Table 7 below.

Results Table 7

|  | Comp. Ex. 1 | Comp. Ex. 2 | Ex. 13 | Ex. 14 |
| --- | --- | --- | --- | --- |
| Main Circuit Refrigerant | R404A | R471A | R471A | R471A |
| DMSS Refrigerant | n/a | n/a | R471A | R471A |
| displacement of the core refrigerant circuit (m3/h) | 100 | 100 | 100 | 100 |
| Evaporation Temperature of the core refrigerant circuit (° C.) | −10 | −10 | −10 | −5 |
| Condensing Temperature of the core refrigerant circuit (° C.) | 40 | 40 | 40 | 40 |
| Cooling Capacity of the core refrigerant circuit (kW) | 45 | 17.6 | 100 | 100 |
| Compressor Efficiency of the core refrigerant circuit | 0.65 | 0.65 | −10 | −5 |
| Cooling Capacity of the core refrigerant circuit as a percentage of R404A in Comparative Example 1 (%) | 100% | 39% | 40 | 40 |
| Power Consumption of DMSS (kW) | NA | NA | 2.29 | 2.78 |
| Power Consumption of total system (kW) | 20.5 | 7.1 | 25.6 | 31.6 |
| Mass Flow Rate of the core refrigerant circuit (kg/hr) | 1535 | 518 | 55 | 65 |
| COP of total heat transfer system | 2.20 | 2.48 | 57% | 70% |
| Subcooling of core refrigerant by subcooling heat exchanger (° C.) | 0 | 0 | 9.4 | 10.4 |
| COP of total heat transfer system as a percentage of R404A in Comparative Example 1 (%) | 100% | 113% | 523 | 634 |

Examples 13 and 14 show that good cooling capacity can be achieved using the present invention, and further emphasizes the flexibility of subcooling refrigerant.

Example 15—Improving Refrigeration System by Installing Dedicated Mechanical Subcooling System (DMSS) and Replacing R404A with R476A Examples 1 to 14 were repeated, but with R476A used to replace R404A. Similar favourable and unexpected results are achieved for the numerous experiments within this Example.

Example 16—Improving Refrigeration System by Installing Dedicated Mechanical Subcooling System (DMSS) and Replacing R404A with Refrigerant B6

Examples 1 to 14 were repeated, but with Refrigerant B6 used to replace R404A. Similar favourable and unexpected results are achieved for the numerous experiments within this Example.

Example 17—Improving Refrigeration System by Installing Dedicated Mechanical Subcooling System (DMSS) and Replacing R448 with R471A Examples 1 to 14 were repeated, but with R471A used to replace R448. Similar favourable and unexpected results are achieved for the numerous experiments within this Example.

Example 18—Improving Refrigeration System by Installing Dedicated Mechanical Subcooling System (DMSS) and Replacing R448 with R476A Examples 1 to 14 were repeated, but with R476A used to replace R448. Similar favourable and unexpected results are achieved for the numerous experiments within this Example.

Example 19—Improving Refrigeration System by Installing Dedicated Mechanical Subcooling System (DMSS) and Replacing R448 with Refrigerant B6

Examples 1 to 14 were repeated, but with Refrigerant B6 used to replace R448. Similar favourable and unexpected results are achieved for the numerous experiments within this Example.

Example 20—Improving Refrigeration System by Installing Dedicated Mechanical Subcooling System (DMSS) and Replacing R134a with R471A Examples 1 to 14 were repeated, but with R471A used to replace R134a. Similar favourable and unexpected results are achieved for the numerous experiments within this Example.

Example 21—Improving Refrigeration System by
Installing Dedicated Mechanical Subcooling System
(DMSS) and Replacing R134a with R476A Examples 1 to 14 were repeated, but with R476A used to replace R134a. Similar favourable and unexpected results are achieved for the numerous experiments within this Example.

Example 22—Improving Refrigeration System by
Installing Dedicated Mechanical Subcooling System
(DMSS) and Replacing R134a with Refrigerant B6

Examples 1 to 14 were repeated, but with Refrigerant B6 to replace R134a. Similar favourable and unexpected results are achieved for the numerous experiments within this Example.

The invention claimed is:
1. A method for improving a heat transfer system, wherein said heat transfer system comprises:
  (iii) an existing refrigerant having a GWP of greater than 150; and
  (iv) an existing refrigeration circuit comprising, in order of refrigerant flow, at least one evaporator located in or near a refrigerated space containing products accessible to consumers, at least one compressor, at least one condenser, and at least one expansion device;
  wherein said method comprises:
  (a) installing a subcooling refrigeration circuit comprising a subcooling refrigerant and, in order of flow, a compressor, a heat exchanger for expelling heat from the subcooling refrigerant, an expansion device, and a subcooling heat exchanger, wherein:
    a. said subcooling heat exchanger thermally connects said subcooling refrigeration circuit and said existing refrigeration circuit between said at least one condenser and said at least one expansion device of the existing refrigeration circuit; and
    b. said subcooling heat exchanger is configured to transfer heat from the existing refrigeration circuit to the subcooling refrigeration circuit; and
  (b) replacing said existing refrigerant with a replacement refrigerant comprising: (1) at least about 50% by weight of R1234ze(E); (2) greater than 0% to about 11% of HFC-134a, HFC-134, HFC-227ea, HFC-125, and combinations of two or more of these; and (3) from about 4% to about 20% by weight of HFO-1336mzz (E), HFO-1224yd(Z), and combinations of these, wherein said replacement refrigerant: (i) has an Occupational Exposure Limit (OEL) greater than 400; (ii) is classified as class A1 by ASHRAE Standard 34; and (iii) has a GWP of about 150 or less.
2. The method of claim 1 wherein said replacement refrigerant is selected from R471A, R476A, B1, B2, B3, B4, B5 and B6.
3. The method of claim 1 wherein said replacement refrigerant is selected from R471A, R476A and B6.
4. The method of claim 1 wherein said existing refrigerant is selected from R404A, R407, R448, R449, R454, R513, R22 and 134a.
5. The method of claim 1 wherein:
  the existing refrigerant is selected from R404A, R407, R448, R449, R454, R513, R22 and 134a;
  the replacement refrigerant is selected from R471A, R476A, B1, B2, B3, B4, B5 and B6; and
  the subcooling refrigerant is selected from R455A, R454C, propane, R1234yf, R152a, R1234ze, R471A, R476A and B6.
6. The method of claim 1 wherein:
  the existing refrigerant is selected from R404, R134a and R448A;
  the replacement refrigerant is selected from R471A, R476A and B6; and
  the subcooling refrigerant is selected from R455A, R454C, R1234yf and R1234ze.
7. The method of claim 1 wherein:
  the existing refrigerant is R404A;
  the replacement refrigerant is R471a; and
  the subcooling refrigerant is selected from R455A, R454C, propane, R1234yf, R152a, R1234ze, R471A, R476A and B6.
8. The method of claim 1 wherein:
  the existing refrigerant is R404A;
  the replacement refrigerant is R471a; and
  the subcooling refrigerant is selected from R455A, R454C, R1234yf and R1234ze.
9. The method of claim 1 wherein:
  the existing refrigerant is R404A;
  the replacement refrigerant is R471a; and
  the subcooling refrigerant is R455A.
10. The method of claim 1 wherein:
  the existing refrigerant is R404A;
  the replacement refrigerant is R471a; and
  the subcooling refrigerant is R454C.
11. The method of claim 1 wherein the replacement refrigerant is used in conjunction with a lubricant selected from polyol esters (POEs), mineral oil, alkylbenzenes (ABs), polyvinyl ethers (PVE) and poly(alpha-olefins) (PAO).
12. The method of claim 1 wherein the replacement refrigerant is used in conjunction with a poly(alkylene glycol) (PAG) lubricant.
13. The method of claim 1 wherein the replacement refrigerant is used in conjunction with a polyvinyl ether (PVE) lubricant.
14. The method of claim 1 wherein the subcooling refrigerant is used in conjunction with a lubricant selected from polyol esters (POEs), mineral oil, alkylbenzenes (ABs), polyvinyl ethers (PVE) and poly(alpha-olefins) (PAO).
15. The method of claim 1 wherein the subcooling refrigerant is used in conjunction with a poly(alkylene glycol) (PAG) lubricant.
16. The method of claim 1 wherein the subcooling refrigerant is used in conjunction with a polyvinyl ether (PVE) lubricant.
17. The method of claim 1 wherein the subcooling refrigerant and the replacement refrigerant are used in conjunction with a lubricant independently selected from polyol esters (POEs), mineral oil, alkylbenzenes (ABs), polyvinyl ethers (PVE) and poly(alpha-olefins) (PAO).
18. The method of claim 1 wherein:
  the replacement refrigerant is used in conjunction with a poly(alkylene glycol) (PAG) lubricant; and
  the subcooling refrigerant is used in conjunction with a poly(alkylene glycol) (PAG) lubricant.
19. The method of claim 1 wherein:
  the replacement refrigerant is used in conjunction with a poly(alkylene glycol) (PAG) lubricant; and
  the subcooling refrigerant is used in conjunction with a polyvinyl ether (PVE) lubricant.

20. The method claim 1 wherein step (b) comprises:
removing at least a portion of a fluid connection between said at least one evaporator and said at least one expansion device of the existing refrigerant circuit; and
installing a replacement fluid connection in which refrigerant passes through the subcooling heat exchanger during passage through the fluid connection.

\* \* \* \* \*